(12) United States Patent
Chipman et al.

(10) Patent No.: US 12,423,199 B2
(45) Date of Patent: Sep. 23, 2025

(54) SYSTEMS AND METHODS FOR SYNCHRONIZING BETWEEN A SOURCE DATABASE CLUSTER AND A DESTINATION DATABASE CLUSTER

(71) Applicant: MongoDB, Inc., New York, NY (US)

(72) Inventors: Ryan Chipman, Westwood, MA (US); Lingzhi Deng, Jersey City, NJ (US); Tim Fogarty, Amsterdam (NL); Max Jacob Hirschhorn, New York, NY (US); Samyukta Lanka, New York, NY (US); Judah Schvimer, New York, NY (US); Andrew Michalski Schwerin, Providence, RI (US); Randolph Tan, Astoria, NY (US); Mark Porter, Seattle, WA (US)

(73) Assignee: MongoDB, Inc., New York, NY (US)

(*) Notice: Subject to any disclaimer, the term of this patent is extended or adjusted under 35 U.S.C. 154(b) by 178 days.

(21) Appl. No.: 18/329,043

(22) Filed: Jun. 5, 2023

(65) Prior Publication Data
US 2023/0393958 A1 Dec. 7, 2023

Related U.S. Application Data

(60) Provisional application No. 63/349,336, filed on Jun. 6, 2022, provisional application No. 63/349,392, filed on Jun. 6, 2022.

(51) Int. Cl.
*G06F 16/00* (2019.01)
*G06F 11/20* (2006.01)
*G06F 16/23* (2019.01)
*G06F 16/27* (2019.01)
*G06F 16/28* (2019.01)

(52) U.S. Cl.
CPC ...... *G06F 11/2041* (2013.01); *G06F 16/2365* (2019.01); *G06F 16/2379* (2019.01); *G06F 16/27* (2019.01); *G06F 16/285* (2019.01)

(58) Field of Classification Search
None
See application file for complete search history.

(56) References Cited

U.S. PATENT DOCUMENTS

| 6,122,640 | A | 9/2000 | Pereira |
| 6,678,882 | B1 | 1/2004 | Hurley |
| 7,603,357 | B1 | 10/2009 | Gourdol |
| 7,933,868 | B2 * | 4/2011 | Singh ............... G06F 16/278 707/625 |
| 8,072,950 | B2 | 12/2011 | Fan |

(Continued)

*Primary Examiner* — Hasanul Mobin
(74) *Attorney, Agent, or Firm* — Wolf, Greenfield & Sacks, P.C.

(57) ABSTRACT

In some embodiments, a database cluster to cluster synchronization system may include multiple replicators coupled to a source database cluster and a destination database cluster, where the source and destination cluster may be shard clusters. Each of the multiple replicators may correspond to a respective subset of the source database cluster and configured to monitor changes of data on the respective subset of the source database cluster and translate the changes of data to one or more database operations to be performed on the destination cluster. The changes of data on the source database may be contained in respective change streams associated with each of the replicators.

18 Claims, 12 Drawing Sheets

(56) References Cited

U.S. PATENT DOCUMENTS

| | | |
|---|---|---|
| 8,352,870 B2 | 1/2013 | Bailor |
| 8,886,667 B2 * | 11/2014 | Goodman ............... G06F 16/27 |
| | | 707/770 |
| 9,251,235 B1 | 2/2016 | Hurst |
| 9,298,792 B2 | 3/2016 | Ylinen |
| 9,448,789 B2 | 9/2016 | Mathur |
| 9,529,731 B1 | 12/2016 | Wallace et al. |
| 9,552,407 B1 | 1/2017 | Hurst |
| 9,846,733 B2 * | 12/2017 | Dennehy ................ G06F 16/23 |
| 10,795,777 B1 * | 10/2020 | Goyal ................ G06F 11/1464 |
| 10,956,446 B1 | 3/2021 | Hurst |
| 11,126,505 B1 * | 9/2021 | Vig ......................... G06F 16/27 |
| 11,294,935 B2 | 4/2022 | Stigsen |
| 11,803,568 B1 * | 10/2023 | Jain .................... G06F 11/3409 |
| 2002/0023113 A1 | 2/2002 | Hsing et al. |
| 2002/0099728 A1 | 7/2002 | Lees et al. |
| 2003/0028683 A1 | 2/2003 | Yorke et al. |
| 2004/0148316 A1 | 7/2004 | Bridge, Jr. et al. |
| 2005/0055445 A1 | 3/2005 | Gupta et al. |
| 2005/0071195 A1 | 3/2005 | Cassel |
| 2006/0020570 A1 | 1/2006 | Wu |
| 2008/0027996 A1 | 1/2008 | Morris |
| 2008/0046400 A1 * | 2/2008 | Shi ...................... H04L 67/1001 |
| | | 707/E17.046 |
| 2009/0210459 A1 | 8/2009 | Nair |
| 2009/0217274 A1 * | 8/2009 | Corbin .................... G06F 9/466 |
| | | 718/101 |
| 2009/0271696 A1 | 10/2009 | Bailor |
| 2011/0178985 A1 * | 7/2011 | San Martin Arribas ..................... |
| | | G06F 16/278 |
| | | 707/E17.007 |
| 2014/0258255 A1 | 9/2014 | Merriman |
| 2016/0179642 A1 * | 6/2016 | Cai ....................... G06F 16/278 |
| | | 714/4.12 |
| 2016/0342335 A1 | 11/2016 | Dey et al. |
| 2017/0075949 A1 | 3/2017 | Stefani et al. |
| 2017/0262521 A1 * | 9/2017 | Cho ..................... G06F 16/9535 |
| 2018/0316703 A1 * | 11/2018 | Mesic ..................... H04L 67/12 |
| 2019/0057142 A1 * | 2/2019 | Wang ................. G06F 16/2379 |
| 2019/0349426 A1 * | 11/2019 | Smith ................... H04L 9/3239 |
| 2019/0354540 A1 | 11/2019 | Stigsen |
| 2020/0341861 A1 | 10/2020 | Ling |
| 2021/0026865 A1 | 1/2021 | He |
| 2023/0393958 A1 | 12/2023 | Chipman et al. |
| 2023/0394064 A1 | 12/2023 | Chipman et al. |

* cited by examiner

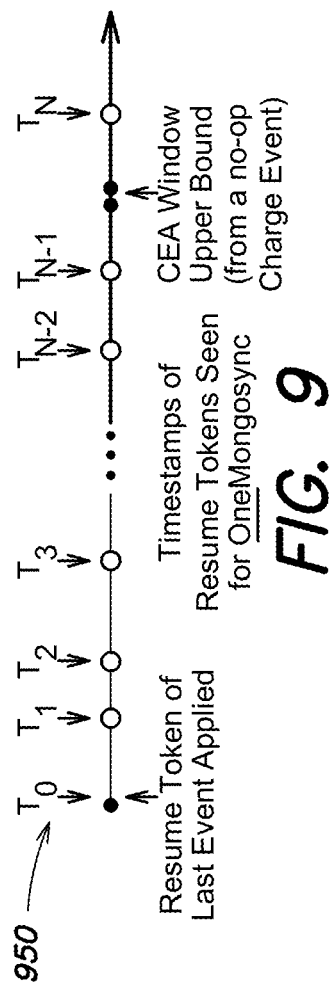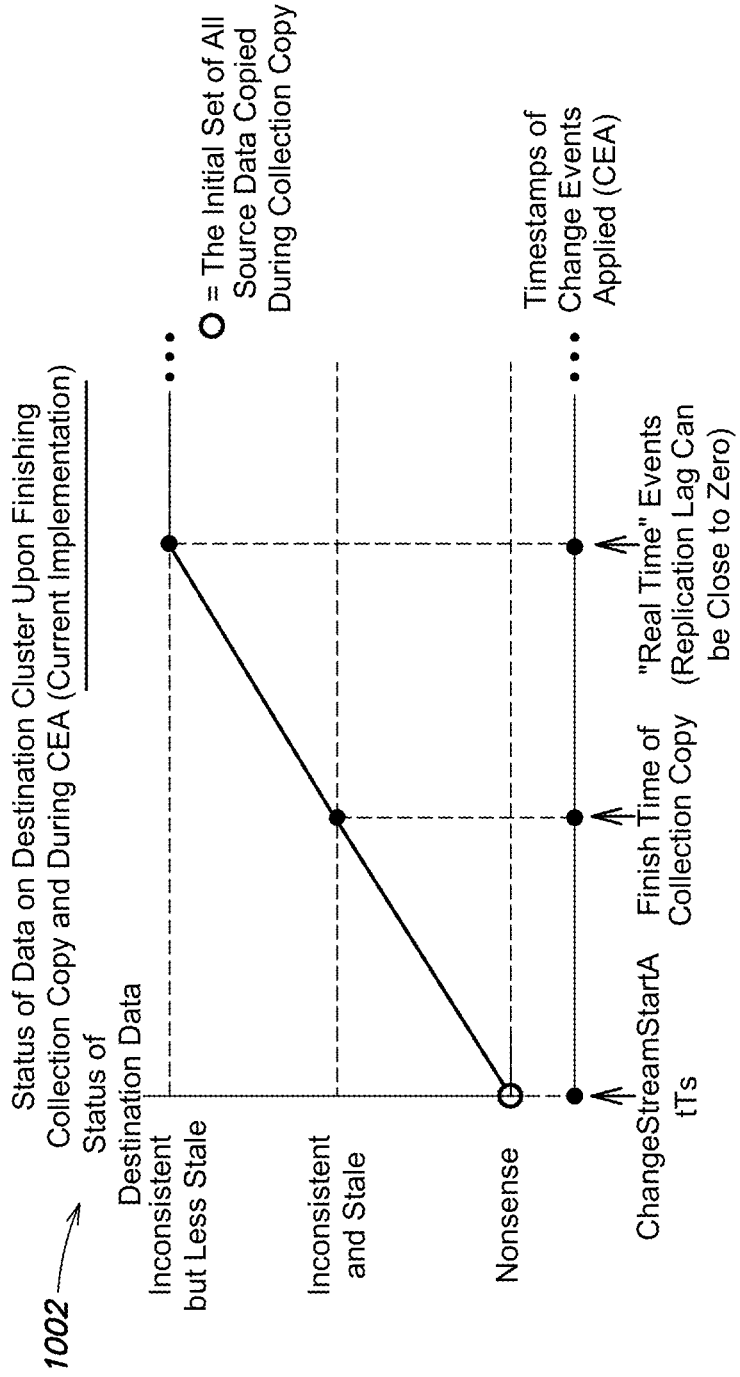

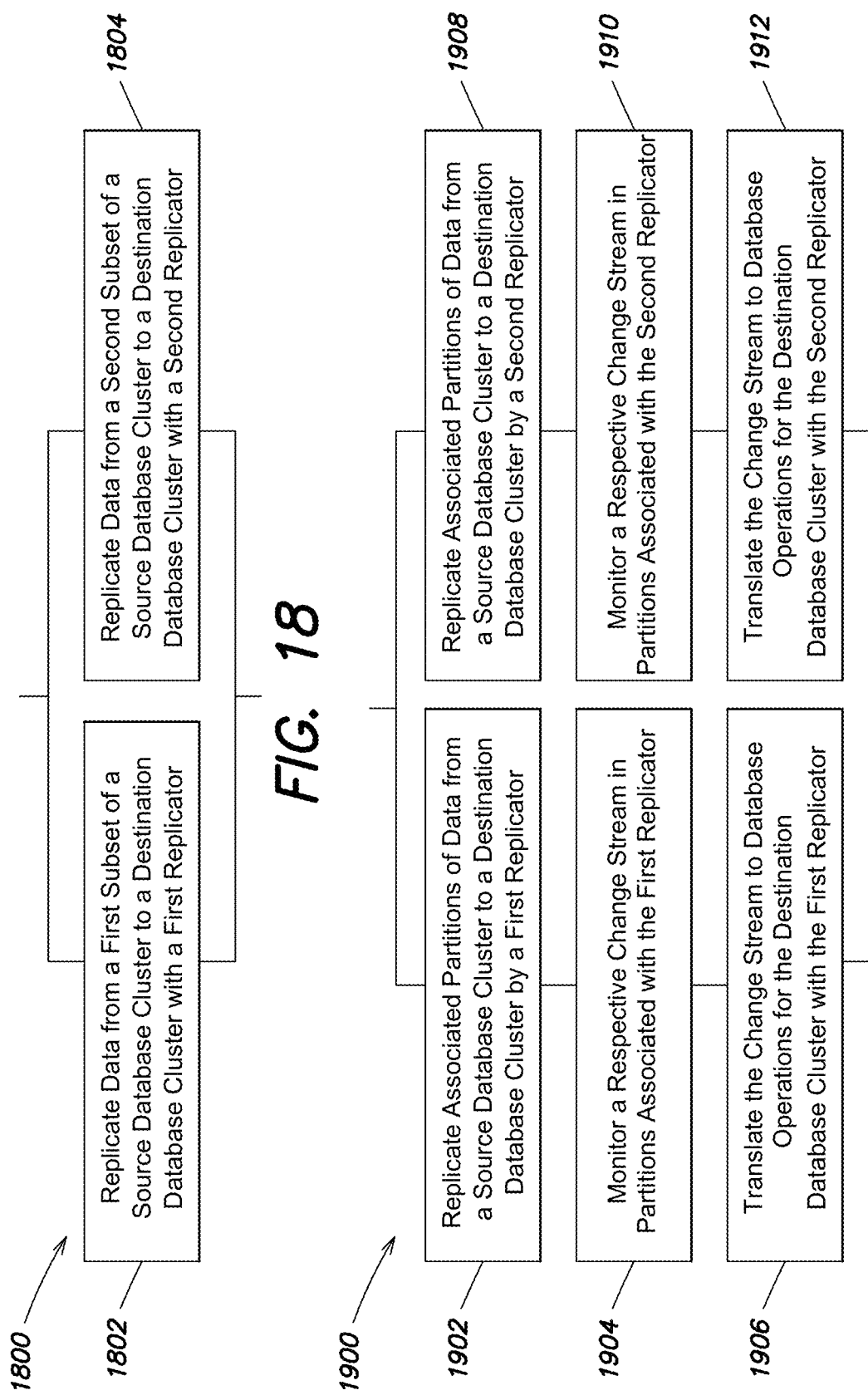

SYSTEMS AND METHODS FOR SYNCHRONIZING BETWEEN A SOURCE DATABASE CLUSTER AND A DESTINATION DATABASE CLUSTER

CROSS-REFERENCE TO RELATED APPLICATIONS

This application claims priority under 35 U.S.C. § 119(e) to U.S. Provisional Application Ser. No. 63/349,336, entitled "SYSTEMS AND METHODS FOR SYNCHRONIZING BETWEEN A SOURCE DATABASE CLUSTER AND A DESTINATION DATABASE CLUSTER", filed Jun. 6, 2022. This application claims priority under 35 U.S.C. § 119(e) to U.S. Provisional Application Ser. No. 63/349,392, entitled "SYSTEMS AND METHOD FOR MANAGING A DISTRIBUTED DATABASE", filed Jun. 6, 2022, each of which is hereby incorporated by reference in their entirety.

BACKGROUND

In a distributed system, database cluster to database cluster synchronization refers to data movement across two different clusters (e.g., at least a source and destination cluster), such as two clusters managed by different vendors, or two clusters located at different geographical regions. Replication is known in replicating data within a same database (e.g., a cluster). For example, in a distributed database having primary nodes and multiple secondary nodes, data on the primary nodes may be replicated to one or more secondary nodes associated with the primary nodes.

SUMMARY

According to some aspects, it is realized that when various existing replication techniques are deployed in cluster to cluster synchronization, the results can be unexpected, random, and/or fail entirely. Various aspects and embodiments discussed below resolve the deficiencies of various known approaches. Further, the technologies described facilitate numerous applications where data movement between clusters is desired.

For example, to aid software development, a database may include two clusters that are setup respectively for development and production, where data in the software development cluster may need to be moved to the production cluster, or vice versa. In another application in the audit and compliance industry, data may be provided to another organization or another company on the team via synchronizing clusters of differing capability or architecture. For example, a separate cluster may be setup for the organization being audited, and data may be replicated to the separate clusters for auditing purposes. In another example application in analytics, there can be operational clusters configured for day-to-day operation of a business and a separate dedicated cluster dedicated for analytics. In other applications, an enterprise exploring a new database system may need to migrate data on its old database system to a new trial database system, with the option of reversing the migration or synchronizing data between the old and new database systems once the data is migrated from the old system to the new system.

Accordingly, the inventors have developed improved systems and methods for cluster to cluster synchronization. A cluster may be a replica set or a sharded cluster, and it may have multiple datasets in different collections and databases internally. In example deployments, a source cluster and a destination cluster may be managed by different vendors, or may be located at different geographical regions. In some embodiments, a cluster to cluster synchronization system may include a plurality of replicators coupled to a source database cluster and a destination database cluster. Each of the plurality of replicators may be responsible for a respective subset of data in the source database cluster, and the plurality of replicators may be executed at least partially in parallel.

In some embodiments, the source database cluster and the destination database cluster may each be organized as shards. A shard references a portion of data within a distributed database. Each cluster can comprise multiple shards, and shards can be hosted on one or more servers or shard servers can host multiple shards of data. Data on respective shards or collections of shards can be associated with replicators. For example, all shards may be associated with a single replicator. In another example, each source shard may have a dedicated replicator. The plurality of replicators may be configured to build indexes of data on the destination database cluster stored in respective shards while replicating the data from the source database cluster to the destination database cluster. In a non-limiting example, all of the replicators are configured to replicate the same indexes as those on the source cluster. In some examples, the replicators may maintain the shard structures from source to destination.

According to some embodiments, the system may scan the indexes constructed on the destination database cluster and check for inconsistencies, such as violations of index uniqueness. Various situations can result in inconsistency. For example, a replicator may break down during an replication operation (e.g., unclean cutover) and result in index inconsistency. Multiple replicators being executed in parallel may result in out-of-order replication and thus, index inconsistency. Accordingly, the system may relax index constraints while allowing the synchronization process to proceed and reinforce the constraints later. For example, the system may allow index violations temporarily by replicating unique indexes as non-unique and converting them back to unique indexes at a later time (e.g., at commit time).

According to some embodiments, in some scenarios, e.g., in disaster recovery, the system may check inconsistency with a validation logic. For example, the system may determine that the index uniqueness is violated, which may be caused by a replicator having broken down (e.g., due to unclean cutover). In response to determining that a violation of indexes exists, the system may report the violation to the user. In some embodiments, the system may provide a tool (e.g., a graphical user interface, an API or system call) to allow the user to correct the violation. For example, a user may issue a system command to manually correct the indexes. In further examples, the system can include user interface prompts to identify inconsistent states, and/or recommendations for manual correction.

In some embodiments, each of the plurality of replicators may be configured to, independently and at least partially in parallel, perform data replication based on respective change streams. A change stream may include any suitable data structure which includes information indicative of data changes on a subset of a cluster (e.g., the source cluster) with which the change stream is associated. The change stream may continuously update as the change of data occurs on the subset of the cluster and can be used by a respective replicator of the plurality of replicators. For example, a first replicator of the plurality of replicators may be configured to monitor a first change stream which includes data indicative of a change of data in the subset of the source database cluster associated with the first replicator. A second replicator of the plurality of replicators may be configured to monitor a second change stream which includes data indicative of a change of data in the subset of the source database cluster associated with the second replicator. Each of the first and second replicators may translate the change of data on respective change streams to one or more database operations (e.g., Create Read Update Delete (CRUD) operations) to be performed to the destination cluster.

In some embodiments, in the case of shard clusters for the source and destination clusters, the change streams associated with the plurality of replicators may be partitioned. For example, the first change stream associated with the first replicator may correspond to a first subset of shards in the source database cluster and provide a stream of data changes that have been performed on first subset of shards (e.g., database data), whereas the second change stream associated with the second replicator may correspond to a second subset of shards in the source database cluster and provide a stream of data changes that have been performed on the second subset of shards (e.g., database data), where the second subset of shards is different from the first subset of shards.

In some embodiments, the system may suspend and resume replication from where the suspended operation left off. In a non-limiting example, the system may include a respective resume data structure associated with each of the replicators. Each replicator may update the data in the associated resume data structure as the replicator performs operations. The resume data structure may be persisted to the destination cluster and may include recovery state for the associated replicator and other information, such as a source to destination mapping. In a non-limiting example, when cluster to cluster synchronization is suspended, the recovery state for each of the replicators is stored in the respective data structure. When cluster to cluster synchronization is resumed, each of the paused replicators will identify the correct direction of replication using the mapping data in the resume data structure, and continue running from the state it was in.

In some embodiments, the system may perform initial synchronization between the source cluster and the destination cluster. For example, the initial synchronization may be one-time replication of data from the source cluster to the destination cluster, which will reach eventual consistency and result in the data in the destination cluster to be identical to the data in the source cluster. In some embodiments, once initial synchronization is completed, the cluster to cluster synchronization may include continuous synchronization between the source cluster and the destination cluster. For example, the system may further cause the plurality of replicators to continue replicating data from the source database cluster to the destination database cluster based on subsequent data change(s) on the source database cluster. As described above, the plurality of replicators may perform similar replication operations based on the respective change streams, which contain subsequent data changes on the source cluster.

In some embodiments, once initial synchronization is completed, or at any other time thereafter when the data on the source cluster and destination cluster are identical (e.g., when replication for each replicator is committed or the synchronization is cutover), the cluster to cluster synchronization may be reversed, to allow data on the destination cluster (or any writes to the destination cluster) to be synchronized to the source cluster. In reverse replication, the plurality of replicators may perform similar replication operations as described above, with a difference being that the change streams may include data indicative of changes of data on the destination cluster (new source cluster). Whereas conventionally replication in this setting is unidirectional source to destination, permitting reverse replication enables data changes on the destination cluster (new source cluster) to be replicated on the source cluster (new destination), as not found in many conventional approaches.

In chunk migration, when documents are moved from one shard to another, a replicator may filter out unowned document (orphan document). For example, a cluster-wide point in time may be defined in the chunk migration protocol to represent when the migration is committed. Then, write and change streams are able to filter out orphan documents.

In some embodiments, the change streams may be partitioned in association with one or more shards. For example, change streams may support a $_passthroughToShard parameter that accepts a shard ID. Thus, for a given shard, the system may return change stream(s) for the given shard. This saves computing resources in that no other shards need to be communicated.

In some embodiments, a filtered replication may be provide in that a subset of data in the source can be replicated to the destination. For example, the system allows users to configure which collections they would like to synchronize and then the replicators will exclusively read those collections. Change streams will be filtered to only those events relevant to the filtered collections. If any new collections are created that match the filter, those will be replicated normally. In the event that a collection is named from out of the filter to being in the filter, the system may provide a provision to replicate the renamed collection. In some embodiments, if a transaction is partially in the filter and partially out of the filter, likely only the part in the filter will be included.

The various embodiments described in the present disclosure provide cluster to cluster synchronization systems and methods for data synchronization between source and destination clusters, where the source and destination clusters may be shard database clusters. As described above, these various embodiments are advantageous over existing database replication techniques by using parallel replicators to synchronize data between large scale shard clusters in an efficient manner. Further, various embodiments allow cluster to cluster synchronization to work in different states, which facilitates various applications as described in the present disclosure.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 9 illustrates timestamps of exemplary resume tokens for an exemplary scenario of an exemplary embodiment;

FIG. 10 is a graph of the status of the destination data as a function of the time stamps of the CEAs for an exemplary scenario of an exemplary embodiment;

FIG. 18 is a flow diagram of an exemplary embodiment of a method 1800 to replicate data from a source database cluster to a destination database cluster with a plurality of replicators.

FIG. 19 is a flow diagram of an exemplary embodiment of a method to replicate data from a source database cluster to a destination database cluster with a plurality of replicators.

DETAILED DESCRIPTION

Figure 1:
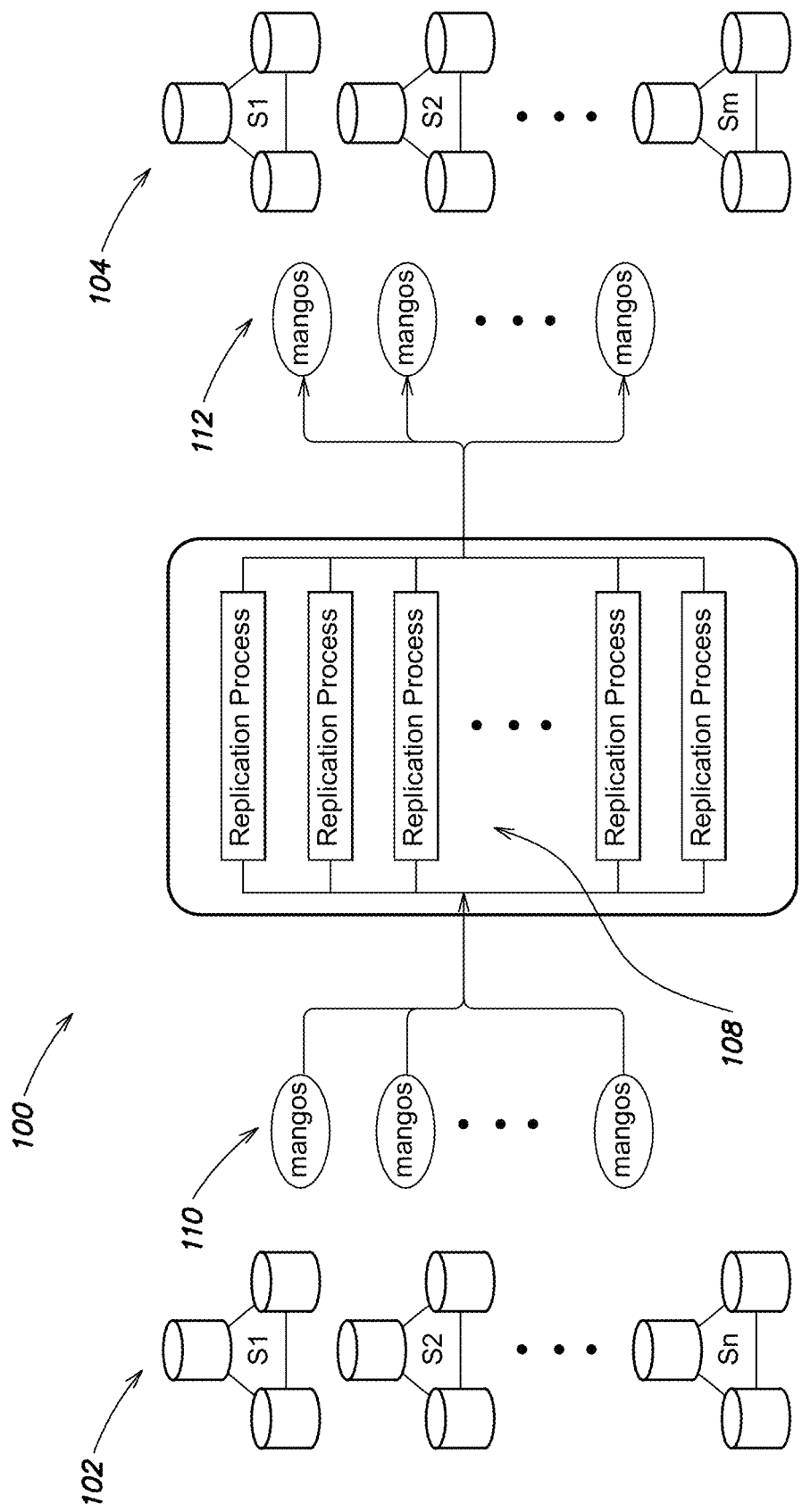
FIG. 1 is block diagram of an example cluster to cluster synchronization system, according to one embodiment.

Stated broadly, various terms in the cluster to cluster synchronization context described in the present disclosure may be interchangeable as appreciated by a person of ordinary skill in the art. For example, synchronization, replication, replicator, Mongosync as used in the context of cluster to cluster synchronization throughout the present disclosure may be interchangeable. Further, cluster and database cluster may also be interchangeable.

The inventors have acknowledged and appreciated that existing database replication technologies, such as those deployed in replicating data within a database, may not be readily suitable for deploying applications such as those described above. For example, a cluster to cluster synchronization may require initial data replication from the source cluster to the destination cluster in an efficient manner due to the size of the cluster and the amount of data that need to be replicated from the source cluster to the destination cluster. Further, while the data is being replicated from the source cluster to the destination cluster, new changes to the data on the source cluster also happen (e.g., user writes new data to the source cluster). Thus, it is a technical challenge to keep up with the high scale data changes on the source while maintaining consistency on the destination.

In another scenario, once the initial replication is completed, cluster to cluster synchronization between the source cluster and the destination cluster may be needed to synchronize any new changes to the data on the source cluster to the destination cluster on a continuous basis. This capability may be useful for disaster recovery (e.g., if the source cluster breaks down, data can be recovered from the destination cluster), or auditing application (e.g., data in the organization's database can be mirrored in the auditor's cluster for auditing). Additionally, and/or alternatively, any changes to the data on the destination cluster (after the initial replication) to the source cluster may also be desirable. This is referred to as reverse replication (synchronization). In other applications that would benefit from cluster to cluster synchronization, data synchronization between the source and destination clusters may be paused, and later resumed in an efficient manner from where the synchronization left off.

Accordingly, the inventors have developed improved systems and methods for cluster to cluster synchronization. In some embodiments, a synchronization system may include a plurality of replicators coupled to a source database cluster and a destination database cluster. Each of the plurality of replicators may be responsible for a respective subset of data in the source database cluster, and plurality of replicators may be executed at least partially in parallel. As such, the parallel replication for different subsets of data in the source cluster may improve the performance of data synchronization by expediting the replication of data from the source to the destination and keeping up with fast changes on the source cluster.

Some embodiments support eventual consistency for data replication on the destination cluster. In some embodiments, if the application quiesces writes on the source cluster (by taking the application to a quiesce mode, for a switchover or any other reason), the source and destination will eventually have identical data. Alternatively, instead of the quiesce mode, some embodiments may stop issuing writes to the cluster to allow for data to be consistent between the source and destination cluster. In some embodiments, the number of writes to the same document or across multiple documents need not be the same across source and destination clusters. In some embodiments, writes may be combined or reordered while relaying from source to destination. In some embodiments, transactions may appear non-atomically on the destination. In some embodiments, if an application quiesces writes on the source, all operations from the source on the destination are eventually applied. In some embodiments, applying all operations from the source (regardless of ordering) eventually bring a consistent copy of the data to the destination. In some embodiments, writes to the same documents may be reordered/combined. For example, when replicating a sharded cluster with per-shard change stream, writes to the same document that are out of order may be reordered as long as eventual consistency can be guaranteed. In some embodiments, sharding support effectively may combine writes (to the same document) by refetching the full document. Thus, some embodiments may provide that the source and destination clusters will eventually have consistent data for the replicated collections if application quiesces writes on the source.

FIG. 1 is a block diagram of an example cluster to cluster synchronization system 100. Synchronization system 100 may be coupled to a source database cluster 102 and a destination database cluster 104. As shown, synchronization system 100 may include a plurality of replicators 108, each configured to perform various operations as described above. For example, each replicator 108 may be responsible for replicating a respective subset of data in the source database cluster 102 to the destination database cluster 104, and plurality of replicators may be executed at least partially in parallel. As shown in FIG. 1, each of the plurality of replicators 108 may communicate with the source cluster 102 and destination cluster 104 through one or more respective routers (e.g., mongos) 110, 112 instead of directly communicating with the clusters 102, 104.

As shown in FIG. 1, each replicator 108 may be implemented as a replication process, where the multiple replication processes may be executed at least partially in parallel. For example, the system may spawn multiple threads running simultaneously, each thread being a replication process and configured to replicate a respective subset of the source cluster 102 to the destination cluster. As described above, the parallel replication for different subsets of data in the source cluster may expedite the replication of data from the source to the destination to keep up with fast changes on the source cluster.

In some embodiments, source cluster 102 and destination cluster 104 may each be organized as shards. Each cluster can comprise multiple shards, and shards can be hosted on one or more servers or shard servers can host multiple shards of data. Data on respective shards or collections of shards can be associated with replicators. Example details of a shard cluster are further described herein. In case of shard clusters for source cluster 102 or destination cluster 104, the plurality of routers 110, 112 may respectively include shard routers associated with the source cluster 102 and destination cluster 104. In some embodiments, system 100 described above may cause the plurality of replicators to perform chunk migration of sharded data from the source cluster to the destination cluster, to achieve eventual consistency, when data on the destination cluster is identical to data on the source cluster.

The inventors have recognized and appreciated that executing replicators at least partially in parallel for synchronizing shard clusters may impose challenges in maintaining the consistency on the destination cluster. For example, intermediate data generated by multiple parallel replicators may become inconsistent accidentally, preventing the destination cluster to achieve eventual consistency. For example, index inconsistency may be caused by out of order execution of parallel replicators. An example of inconsistency includes violations of index uniqueness for the destination cluster. For example, as multiple replicators replicate data in parallel, they may also independently generate keys with the same value in a unique index as a result.

Accordingly, some embodiments are provided to solve the technical problems discussed above and/or improve the performance of synchronization between two clusters. In some embodiments, each of the plurality of replicators may be configured to replicate indexes of data on the destination database cluster stored in respective shards while replicating the data from the source database cluster to the destination database cluster. The system may cause the replicators to replicate indexes as non-unique indexes, thus allow index uniqueness violations temporarily while the replicators are performing replication in parallel. When replications of the plurality of replicators are complete (e.g., when committed), the system may convert the non-unique indexes to unique indexes.

In some embodiments, the system may scan the indexes on the destination database cluster and check for violations of index uniqueness. For example, the system may determine that a violation of index uniqueness occurred if a field, which is supposed to be unique across all documents in the destination cluster already existed. In a non-limiting example, a user email address which appears in multiple documents in the destination cluster have multiple field values that correspond to a unique index, and in response, the system may determine that the index uniqueness rule is violated.

In performing the replication operation, each replicator 108 may be configured to independently monitor a change of data on the source cluster and translate the change of data to one or more database operations to be performed on the destination cluster. For example, the one or more database operations to be performed on the destination cluster may include CRUD operations (namely, create, read, update, and delete). The change of data may be contained in a respective change stream associated with each replicator 108. For example, a first replicator of the plurality of replicators 108 may be configured to monitor a first change stream which comprises data indicative of a change of data in the subset of the source database cluster associated with the first replicator, and translate the change of data in the first change stream to one or more database operations to be performed to the destination cluster. Similarly, a second replicator of the plurality of replicators may be configured to monitor a second change stream which comprises data indicative of a change of data in the subset of the source database cluster associated with the second replicator, and translate the change of data in the second change stream to one or more database operations to be performed to the destination cluster.

In case of shard clusters for the source cluster 102 and destination cluster 104, the change streams associated with the plurality of replicators 108 may be partitioned. For example, the first change stream associated with the first replicator may correspond to a first subset of shards in the source database cluster, whereas the second change stream associated with the second replicator may correspond to a second subset of shards in the source database cluster different from the first subset of shards. Further, in case of shard clusters for the source cluster 102 and destination cluster 104, each of the shard clusters may have a different topology. For example, the source database cluster and the destination database cluster may each have a different number of replica nodes.

In some embodiments, chunk migrations of sharded data may be allowed within the source cluster or the destination cluster. In some scenarios, chunk migration within the destination cluster may cause the destination cluster to become imbalanced. For example, as the result of chunk migrations, a shard on the destination cluster may have a significantly higher number of documents than another shard on the destination cluster. Accordingly, a balancer in the destination cluster may perform shard balancing by moving some documents from one shard to another shard in the destination cluster. In some embodiments, the system may also perform balancing on the source cluster, independently of performing the balancing on the destination cluster.

The inventors have further recognized and appreciated that executing replicators in parallel may also result in conflicts, where out-of-order change events may occur if a document is moved between shards (e.g., by a chunk migration). For example, a later update to a document could be seen (by the system) before an earlier update.

Accordingly, in some embodiments, for each collection in the destination sharded cluster, the replicator stores information about the most recently applied change event to each document. This information is maintained as an additional sharded collection. Thus, the per document "last write" state may be used to determine whether a change event should be applied or ignored. In some embodiments, a replicator may compare the clusterTime of a change event with tsOfLastFetch. If it is determined that clusterTime<tsOfLastFetch, then the replicator may ignore the change event.

In one embodiment relating to chunk migrations on a server, a recipient shard enters a critical section blocking writes after it has fetched the last modification (e.g., after the donor has entered its critical section blocking writes), the recipient will enter its critical section blocking writes). In some embodiments, a donor, after it has committed a chunk migration, will instruct the recipient that it may refresh its filtering metadata and then exit its critical section, via a new command such as recvChunkReleaseCritSec. In some embodiments, to minimize the time during which the critical sections are held, post-commit refreshes on both the donor and the recipient may be done in parallel. In some embodiments, each participant may release its critical section as soon as the refresh is complete. In some embodiments, in case of a recipient failover while it is holding the critical section, a new primary "recovers" it and waits for instructions from the donor to release it. In some embodiments, a new recovery document on the recipient is persisted before it enters the critical section. In some embodiments, if that document is found on step-up, the shard may restore a state such as the MigrationDestinationManager state. In some embodiment, a donor may retry sending the recvChunkReleaseCritSec command until it receives a favorable response before entering a "migration complete" state. In some embodiments, in case of a donor shard election between the beginning of the donor critical section and the migration complete state, the new donor primary may re-issue the recvChunkReleaseCritSec command to ensure the recipient's critical section is released. In some embodiments, chunk manager information that is relied upon to filter writes may reside on the configsvr. In some embodiments, because the clusterTime at which the ownership changed exists in one single place (e.g., config.chunks in the configsvr), shards will be consistent in knowing at what time one gave up/took ownership of the chunk.

In other embodiments relating to chunk migrations on a server, the knowledge of what ranges are orphans from the config.rangeDeletions collection, which is a shard-local collection, are sourced. In some embodiments, both shards may agree in a clusterTime at which the ownership changed. In some embodiments, a migration coordinator may write updates to both a donor and a recipient's config.rangeDeletions at the same clusterTime, possibly by means of a transaction. In some embodiments, this point in time may be aligned with the clusterTime written to the chunk entry in config.chunks, which may be used to perform the routing.

In some scenarios relating to chunk migrations on a server, write operations on orphaned documents may generate events on change streams that may be unexpected by users. In an exemplary scenario, a write operation broadcasted to all the shards while a moveChunk operation is in progress and the orphaned documents owned by the donor shard may also be addressed by this operation, thereby generating unexpected events on the configured change streams.

In some embodiments relating to chunk migrations on a server, a write path checks whether a current operation is writing on an orphan document. Some embodiments may skip the write operation that affects an orphan document, and other embodiments may perform the write operation but mark it so that it may be filtered by change streams. Some embodiments may skip write operations processed by the Mongosyncs that affect orphan documents. Some embodiments may perform direct write operations against the shards that affect orphan documents but mark them in an operation log. In some scenarios, direct writes to shards affecting orphan documents (e.g., manual cleanup of range deletions) are allowed.

In some embodiments relating to chunk migrations on a server, before executing an update/delete operation, a determination is made as to whether the operation is affecting an orphan document or not. In some embodiments, this determination is done at the query-execution level. In some embodiments, the current operation is skipped if it affects an orphan document and a changestream event is not generated. In other embodiments, the value of a flag (e.g., fromMigrate) may be overridden such that if the current operation affects an orphan document, the generated entry in an operation log will be flagged. In some embodiments, these operation log entries may be filtered by the change streams. In some embodiments, a determination as to whether a document is owned by a current shard need not be made if if there are no range deletion tasks for the collection on that shard. In other embodiments, each operation log entry is annotated with additional information identifying orphaned documents. In some embodiments, a donor and recipient uses the same migration protocol. In some embodiments, a donor informs the recipient of which migration protocol it should use. In some embodiments, the migration protocol is not changed during a moveChunk execution.

In some embodiments relating to chunk migrations on a server, the migration protocol may define a cluster-wide point in time in which the ownership of a chunk is transferred and may filter writes on orphaned documents. In some embodiments, while a chunk migration is being committed to the configsvr, a donor shard may hold the critical section. In some embodiments, once the commit is completed, the donor refreshes its filtering metadata to establish a definite ownership knowledge and then releases the critical section. In some embodiments, to be able to avoid broadcast writes on orphaned (unowned) documents, the shards have a definite knowledge of what chunks it owns at any time when a write is possible (i.e., at any time when the critical section is not taken). In some embodiments, to ensure that the recipient shard has correct knowledge of its owned ranges during the migration commit, the recipient shard may hold the critical section blocking writes during the migration commit. In some embodiments, only writes are blocked because reads may rely on the shard versioning protocol to ensure the proper filtering information is used.

In some embodiments relating to cluster to cluster migration, when the source cluster is a sharded cluster, multiple replicator processes may be used for scalability. In some embodiments, conflicts due to the use of multiple replicators during the change event application (CEA) phase of the replication are resolved. In some embodiments, each replicator process is executed with multiple roles during CEA including:

CRUD-processing Replicator: This role replicates inserts, updates, and deletes from a single source shard. In some embodiments, CRUD changes events are processed from a change stream cursor which targets a single shard. By consuming only an individual shard cursor, an additional replicator may be added to the system in some embodiments to speed up replication without introducing overhead with an order of the number of shards to the source sharded cluster. Some embodiments include special handling for per-shard DDL events like 'create' in order to ensure that future CRUD operations execute on the right namespaces.

DDL-processing Replicator: This role replicates collection and view DDL operations, as well as the sharding DDL commands like "shardCollection." In some embodiments, the DDL change events may be processed from a change stream cursor which merges the results across all shards. On some embodiments, a single Replicator process uses a merged change stream cursor to avoid namespace clashes that would otherwise be incurred by out-of-order DDL events handling. In some embodiments, a coordinator processor will be designated as the DDL-processing replicator for simplicity.

In some embodiments, for each collection in the destination sharded cluster, the replicator stores information about the most recently applied change event to each document. In some embodiments, this information is maintained as an additional sharded collection with various fields including one of more the following:

_id: The _id of the document in the destination sharded cluster, which is also used as the shard key of this collection.

tsOfLastApply: The clusterTime of the change event which most recently inserted, updated, or deleted this document.

tsOfLastFetch: This field limits the number of times a document must be fetched when processing change events with clusterTime≤tsOfLastFetch (e.g., already have their effects reflected in the document fetched from the source sharded cluster). In some embodiments, this field stores the value of the afterClusterTime used to fetch the document from the source sharded cluster.

In some embodiments, the last write state collections is stored in the Mongosync database holding the persisted metadata for replication. In some embodiments, each user database will have one such collection that stores the last write states of all the documents in this database, which will only be populated during the change event application phase. In some embodiments, these collections are created during the handling of create collection events and be named as lastWriteStates.<originalDBName>. In some embodiments, these collections will be created with {locale: "simple"} as their collection default collation and sharded by {_id: 1}. In some embodiments, the _id field of these collections will be a combination of collectionUUID and _id of the original document such as: {collUUID: <originalCollUUID>, docID:<originalDocID>}. In some embodiments, the queries and updates on these collections as well as user collections use simple collation.

In some embodiments, each of the plurality of replicators may be configured to operate in one of multiple states, such as IDLE, RUNNING (e.g., data replication is being performed), PAUSED (e.g., replication is being paused, for example, by a user), COMMITTING (e.g., replication process is beginning to cutover, for example, by a user command), and COMMITTED (e.g., the replication process has finished committing). These various states for the plurality of replicators allow the cluster to cluster synchronization to facilitate various applications and use cases. For example, the system may cause the plurality of replicators to suspend and resume replication from where the suspended operations left off. In a non-limiting example, the system may include a respective resume data structure associated with each of the replicators, which may update the data in the associated resume data structure as each replicator perform operations. The resume data structure may be persisted to the destination cluster and may include recovery states for the associated replicator and other information, such as a source to destination mapping. When cluster to cluster synchronization is resumed, each of the paused replicators will transition from PAUSED state to RUNNING state, where the replicator may identify the correct direction of replication using the mapping data in the resume data structure, and continue running from the state it was in.

In some embodiments, system 100 may perform an initial synchronization between the source cluster 102 and the destination cluster 104. For example, the initial synchronization may be one-time replication of data from the source cluster to the destination cluster, which results in the data in the destination cluster being identical to the data in the source cluster. In some embodiments, once the initial synchronization is completed, the cluster to cluster synchronization may include continuous synchronization between the source cluster and the destination cluster. For example, system 100 may further cause the plurality of replicators 108 to continue replicating data from the source database cluster to the destination database cluster based on subsequent data changes on the source database cluster. As described above, the plurality of replicators may perform similar replication operations based on the respective change streams, which contain subsequent data changes on the source cluster.

In some embodiments, once the initial synchronization is completed, and/or at any other time thereafter when the data on the source cluster and destination cluster are identical (e.g., when the replication of data for each replicator is committed, for example, the state of each replicator being COMMITTED), system 100 may reverse the cluster to cluster synchronization, to allow data on the destination cluster (or any writes to the destination cluster) to be synchronized to the source cluster. In reverse replication, the plurality of replicators 108 may perform similar replication operations as described above, with a difference being that the change streams may contain data changes on the destination cluster (new source cluster) and the resume data structure may be persisted to the source cluster (new destination cluster).

In some embodiments, system 100, or the plurality of replicators 108 as described above, may co-exist with and perform independently from other database replication architecture in a database system. For example, another replication architecture may include a primary node hosting data of the source cluster and secondary nodes hosting copies of the primary node data, where the primary node accepts and processes write operations against the hosted data of the source cluster, and maintains an operation log reflecting changes to the hosted data of the source cluster. The secondary nodes maintain consistency in the hosted copies of the primary node data base on executing operations from the operation log. An example of another replication architecture is described in detail in U.S. patent application Ser. No. 12/977,563, entitled "METHOD AND APPARATUS FOR MAINTAINING REPLICA SETS," the content of which is herein incorporated by reference in its entirety. The replication architecture as described in the above reference may be coupled to the source and/or destination clusters and co-exist with system 100, in some embodiments. System 100 and the replication architecture as described in the above reference may also be executed independently.

Figure 2:
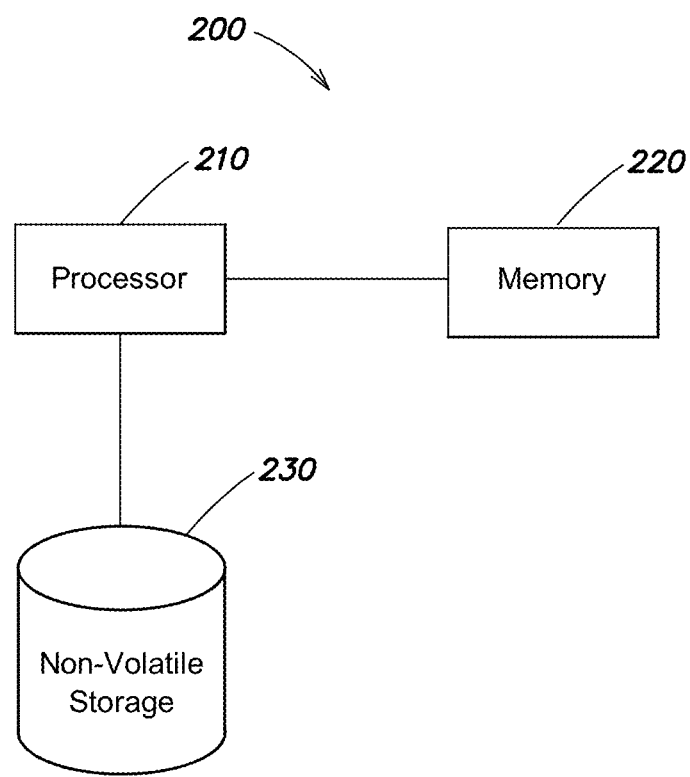
FIG. 2 is an example block diagram of a special purpose computer system that can be configured to execute the functions discussed herein.

Modifications and variations of the discussed embodiments will be apparent to those of ordinary skill in the art and all such modifications and variations are included within the scope of the claims. An illustrative implementation of a computer system 200 that may be used in connection with any of the embodiments of the disclosure provided herein is shown in FIG. 2. The computer system 200 may include one or more processors 210 and one or more articles of manufacture that comprise non-transitory computer-readable storage media (e.g., memory 220 and one or more non-volatile storage media 230). The processor 210 may control writing data to and reading data from the memory 220 and the non-volatile storage device 230 in any suitable manner. To perform any of the functionality described herein, the processor 210 may execute one or more processor-executable instructions stored in one or more non-transitory computer-readable storage media (e.g., the memory 220), which may serve as non-transitory computer-readable storage media storing processor-executable instructions for execution by the processor 210.

According to some embodiments of the present invention, a managed database system, can be configured as a shard cluster and may implement a source database cluster (e.g., 102 in FIG. 1) and/or a destination database cluster (e.g., 104 in FIG. 1). The shard cluster is the grouping of shards that collectively represent the data within the database. In an example, a shard cluster may comprise multiple shards of data, each having multiple chunks. Each shard may include a replica set, each node of which may be referred to as a shard server. The managed database system can include one or more configuration servers for metadata management, and shard router processes. Metadata for the shard cluster can include, for example, information on the ranges of data stored in each partition, information associated with managing the shard cluster, partition counts, number of shard servers, data index information, partition size constraints, data distribution thresholds, among other options. In some embodiments, the database system includes a driver that receives submissions of transactions and/or operations from a client. The driver can be configured to receive and handle submissions of transactions and/or operations from a client application. For example, the driver can be configured to receive one or more transactions from the client, and command one or more of the shard servers of the database system to execute the transaction(s).

In some embodiments, the source cluster 102 described above with reference to FIG. 1 may be a component of the database system. For example, the source cluster 102 may receive database commands (e.g., write new data) from the client and/or the driver, and the plurality of replicators 108 may communicate with the source cluster 102 through one or more routers. Similarly, the destination cluster 104 described above with reference to FIG. 1 may also be a component of the database system.

In some embodiments, each shard of data can be configured to reside on one or more servers executing database operations for storing, retrieving, managing, removing and/or updating data. In some embodiments, a shard server contains multiple partitions of data which can also be referred to as "chunks" of database data. In some embodiments, a shard of data corresponds to a chunk of data. A chunk is also a reference to a partition of database data. A chunk can be configured as a contiguous range of data from a particular collection in the database. In some embodiments, collections are logical organizations of subsets of database data. In some embodiments, a collection can comprise one or more documents. A document can comprise a unit of data storage. The document can include one or more fields and one or more values stored in the field(s). In one example, a collection of documents is a named grouping of the data, for example, a named grouping of documents. The named grouping can be homogenous or heterogeneous. In some embodiments, collections are organizations of database data similar to relational database tables.

In some embodiments, configurations within a shard cluster can be defined by metadata associated with the managed database referred to as shard metadata. Shard metadata can include information about collections within a given database, the number of collections, data associated with accessing the collections, database key properties for a given collection, ranges of key values associated with a given partition, shard, and/or chunk of data within a given collections, to provide some examples.

In some embodiments, establishing an appropriate shard key facilitates the efficient management of data within the shard cluster. To partition a collection, a shard key pattern can be specified. The shard key pattern, in some embodiments, can be similar to the key pattern used to define an index. The shard key pattern establishes one or more fields to define the shard key upon which the managed database can distribute data. In some embodiments, the shard key pattern can be input through a management process. The shard key pattern can be predefined and/or dynamically generated. Once established, the shard key pattern can be used to control the partitioning of data. The data can be partitioned in chunks of data. A shard of data can be a chunk. The chunks of data are typically constructed of contiguous ranges of data. According to one embodiment, the congruous range of data is defined based on database key values or database key patterns used associated with the data. In some examples, chunks are defined by a triple (collection, min- Key, and maxKey). A given chunk can be configured with a name for the collection to which the chunk belongs corresponding to collection in the triples and a range of key values that define the beginning and the end of the data found within the chunk corresponding to minKey and maxKey. In one example, the shard key K associated with a given document within a collection assigns that document to the chunk where the value for K falls within the values defined by minKey and maxKey. Thus, the shard database key/shard database key pattern defines the range of data found within a given chunk. The shard key ranges associated with a given partition can be used by the shard cluster (e.g., through a router process) to direct database requests to appropriate shard servers hosting the particular partition.

In some embodiments, a chunk may have a maximum size. In some implementations, the maximum size can be predetermined. In some embodiments, the maximum size can be dynamically established. In some embodiments, a maximum size of 200 Mb establishes a good threshold that balances the costs of sharding (e.g., the computational burden associated with the copying/moving of the data and the versioning the chunks) against the improvement in processing by having sharded data. Some embodiments support compound shard keys/shard key patterns.

In some embodiments, the shard key should be selected to ensurethey are granular enough to provide for an even distribution of data. For instance, when a shard key is based on name, the database can be checked to insure there are not a disproportionate number of users with the same name. In such a case, an individual chunk can become too large and further, because of the key selected, be unable to split. In some implementations, logic can be implemented within the shard cluster to assist in selecting of the shard key. Distributions can be established and analyzed, for example during a testing phase, to ensure that key does not invoke disproportionate distributions. For example, where the entire range comprises just a single key on name and a disproportionate number of users share the same name, it can become impossible to split chunks of the data without creating a new shard key. Thus, for a database where it is possible that a single value within a shard key range might grow exceptionally large, a compound shard key can be constructed that enables further discrimination of the values that a single key selection.

In some embodiments, a chunk of a data can also be associated with a maximum size threshold which defines that maximum size a given chunk can reach before a splitting operations is performed on the data within the chunk. In some embodiments, once the data within a given chunk reaches the maximum size, a managed database or a shard cluster can be configured to automatically generate a new chunk having its own range of contiguous data. In some examples, the data within the original chunk is split, approximately half the data remaining in the original chunk and approximately half the data being copied into the new created chunk. Although in some embodiments, the split can occur so that different portions of data remain in the original chunk and/or are copied into the new chunk.

In some embodiments, sharding of the database in data chunks, that is the partitioning of the data in the database, occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The B SON entity can be referred to as a document. In some examples, BSON is designed to be efficient in space, but in many cases is not much more efficient than JSON. In some cases BSON can employ more space than JSON to encode information. In one embodiment, this results from one of the BSON design goals: traversability. In some examples, BSON adds some additional information to documents, like length prefixes, that make it the document easier and faster to traverse. BSON is also designed to be fast to encode and decode. For example, integers are stored as 32 (or 64) bit integers, so they don't need to be parsed to and from text. This uses more space than JSON for small integers, but is much faster to parse.

In some embodiments, the managed database system may have any suitable number of shards, configuration servers, and/or shard router processes which can increase the capacity of the managed database system. The shard router processes handle incoming requests (e.g., transactions and/or operations) from clients (e.g., applications, web services, user initiated requests, application protocol interfaces, etc). The router processes are configured to provide a transparent interface to handle database requests. In particular, the clients need not know that a database request is being served by a sharded database. The shard router processes receive client requests and route the database requests to one or more appropriate shards on shard servers.

In some embodiments, a router process can be configured to operate as a routing and coordination process that makes the various components of the cluster look like a single system, for example, to client. In response to receiving a client request (e.g., a write operation) via the driver, the router process routes the request to the appropriate shard or shards. The shard(s) return any results to the router process. The router process can merge any results and communicate the merged result back to the driver. The driver can use the results for additional processing and/or communicate results to the client.

In some embodiments, a shard may be hosted by a replica set. The replica set may include a primary node and one or more secondary nodes. In some embodiments, each of the nodes of the replica set may be a separate shard server to provide redundancy, and protection against failures. In some embodiments, the primary node may perform write operations. The secondary node(s) may replicate write operations performed by the primary node to provide redundancy. In some embodiments, if the primary node is unavailable, the database system may be unable to perform a write operation. For example, if the primary node of a replica set hosting a shard shuts down, the database may be unable to execute the write operation on the shard during the period that the primary node is shut down, or until a new primary node is selected. In some embodiments, the driver can be configured to transmit one or more write commands to a primary node of a replica set to perform one or more write operations submitted by the client. For example, the driver can be configured to connect to the primary node to transmit the write command(s) to the primary node to perform write operation(s) submitted by the client.

In some embodiments, the router process is configured to establish current state information for the data distributed throughout the database by requesting metadata information on the database from the configuration server(s). The request for metadata information can be executed on startup of a routing process. Further requests can be initiated by the routing process and/or can be initiated by a configuration server. In one example, a change at the configuration server can trigger a distribution of updates to any routing processes.

In some embodiments, any changes that occur on the configuration server(s) can be propagated to each router process, as needed. In one example, router processes can be configured to poll the configuration servers(s) to update their state information periodically. In other examples, router processes can be configured to poll the configuration servers(s) to update their state information on a schedule, periodically, intermittently, and can be further configured to received updates pushed from the configuration server(s) and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process can be configured without persistent state information. For example, at initiation the router process cannot fully route data requests until its state is updated with the metadata describing the distribution of data throughout the shards.

In some embodiments, router processes can run on any server within the managed database and/or on any number of server(s) that is desired. For example, the router processes can be executed on stand-alone systems, and in other examples the router processes can be run on the shard servers themselves. In yet other examples, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the managed database. In some examples, the router processes do not coordinate processing, rather each router process can be configured to act independently. In some environments, this property enables unlimited numbers of router processes with virtually no additional complexity, as all the router processes receive their state information from the configuration servers and no coordination between the router processes is required for routing data requests.

In some embodiments, configuration server(s) are configured to store and manage the database's metadata. In some embodiments, the metadata includes basic information on each shard in the shard cluster including, for example, network communication information, server information, number of chunks of data, chunk version, number of shards of data, shard version, and other management information for routing processes, database management processes, chunk splitting processes, etc. According to some embodiments, chunk information can be the primary data stored by the configuration server(s). In some examples, chunks are defined by a triple (collection, minKey, and maxKey) and the metadata stored on the configuration servers establishes the relevant values for a given chunk of data.

In some embodiments, each of the installed configuration server(s) has a complete copy of all the chunk metadata information for the managed database. According to one aspect, various replication strategies can be implemented to maintain consistency between configuration servers. In some embodiments, updates to configuration data stored on the configuration server can require additional processes for insuring consistency. For example, a two-phase commit operation, is used to ensure the consistency of the configuration data amongst the configuration servers. In another example, various atomic commitment protocols (ACP) are used to insure consistency of the database metadata on any configuration servers.

The inventors have recognized that in addition to needing to replicate the changes occurring to data on a source cluster, some users may have large amounts of existing data on the source cluster that needs to be replicated (e.g., hundreds of gigabytes to terabytes). In some embodiments, a collection copy phase may replicate this data upfront before handing off control to a change event application (CEA) phase to make this data consistent on the destination cluster.

The inventors have also recognized that the collection copy phase may take a long time (e.g., days) and that if may changes occur to the source cluster during this phase, the oldest change may get pushed out of the source's operation log (e.g., fall off the operation log). As a result, information may be lost, CEA may not be able to apply all the required changes, the migration may need to be restarted. The inventors have realized that this may be problematic to users because restarting a migration may result in substantial lost time. Moreover, there may be a cognitive overhead and resource considerations in picking the right size for the operation log for a migration. In addition, a migration may not even be possible in some environments with a very high write load.

In some embodiments, operation log entries may be buffered into a file on the source cluster, thereby effectively lengthening the operation log window beyond its normal limit. Operation log buffering, however, may require substantial disk space. Resuming CEA may be difficult because reading from the middle of an operation log buffering file may be difficult. Operation log buffering may create a dependency on the machine here the operation buffer log resides. Accordingly, in some embodiments, the collection copy phase may interleave copying partitions with applying change events.

Some embodiments include various testing features (e.g., for improved test coverage for oplog rollover resistance). In some embodiments, passthrough tests are designed to spend more time in the collection copy phase. In some embodiments, a mechanism allows passthrough tests to be slowed down (e.g., sleeping during the collection copy phase). In some embodiments, the default partition size is 400 megabytes (MB). In some embodiments, the partition size is set to smaller values. In some embodiments, passthrough tests targe multi-partition logic. In some embodiments, performance workloads having a large volume of data to copy upfront and a large number of writes, are executed.

In some embodiments, an initial synchronization of a collection copy phase operates on units of work called partitions. In some embodiments, the partitions include metadata capturing a set of documents having identifiers within a particular range. In some embodiments, a limited number of partitions are copied and the change events that occurred during the time the partitions are copied are applied. In this manner, change events will be reflected on the destination sooner and will be permitted to fall off the operation log sooner as well. In some embodiments, copying partitions may be interleaved with a finite number of CEA cycles, until the copying of the partitions is finished. Then, the normal CEA phase resumes.

In some embodiments, there is a many-to-many relationship between Mongsosyncs and shards, meaning that a Mongosync is free to copy a partition with documents belonging to any shard. In some embodiments, documents may span more than one shard. In some embodiments, a Mongosync is not tied to a particular shard for copying partitions. In these embodiments, a partition key is not tied to a shard key, need not be mindful of a partition order and need not handle partitions spanning multiple shards.

In some embodiments, each MongoSync opens its own per-shard change stream after all the Mongosyncs collectively reach a CEA phase. In some embodiments, a many-to-many relationship between Mongosyncs and shards are preserved for a given partition. In some embodiments, when deciding how to apply change events for a given partition, a change stream may be opened to targets all shards contained within the partition's documents. In some embodiments, a one to one stream relationship between change streams and Mongosyncs are preserved. In some embodiments, each Mongosync will be responsible for applying the change events that occurred on its shard, regardless of which shards its partitions are targeting.

In some embodiments, a partition may touch all shards. In some embodiments a change stream may touch only one shard. In some embodiments, change streams are coordinated so as all relevant change events that occurred for partitions that have been copied are processed. In some embodiments, change streams agree on a start time for applying events that occurred while a partition is copied. In some embodiments, each change streams uses the starting time value in a global ChangeStreamStartAtTs.

In some embodiments, the change events for all partitions that have been copied are captured in a Change Event Application (CEA) window. In some embodiments, the CEA window is progressively advanced as more partitions are copied, and background CEA cycles are run in a goroutine. Specifically, copying partitions may advance an upper bound of the CEA window, and running CEA cycles may advance a lower bound of the CEA windows. In some embodiments, advancing the lower bound of the CEA window avoids falling off the operation log. In some embodiments, the lower and upper bounds of the CEA window are timestamps from the source cluster.

Figure 3:
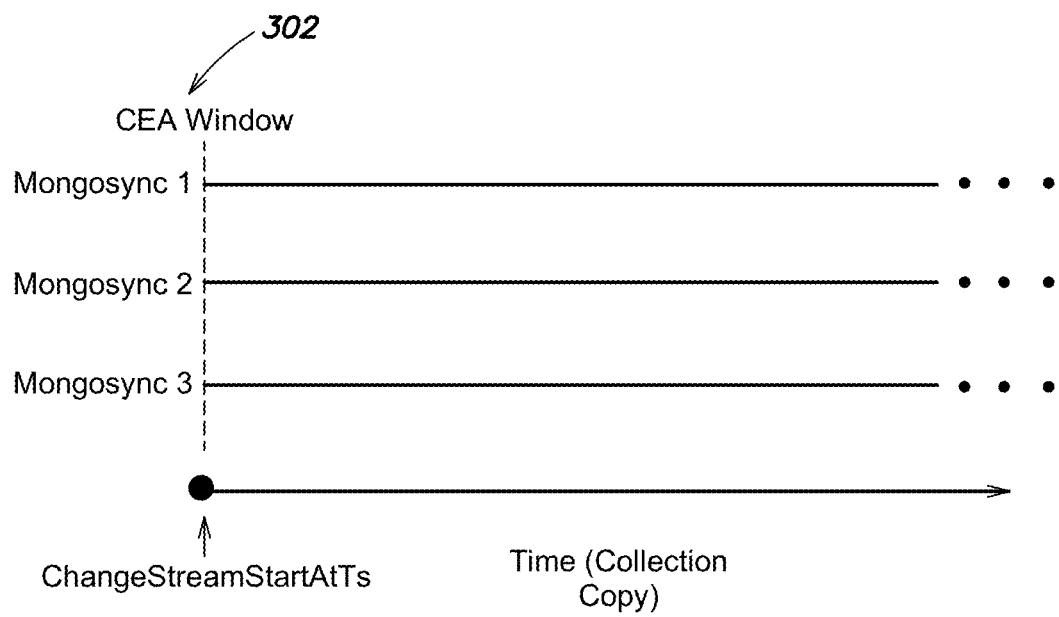
FIG. 3 illustrates a lower bound of a CEA window for an exemplary scenario of an exemplary embodiment.
Figure 4:
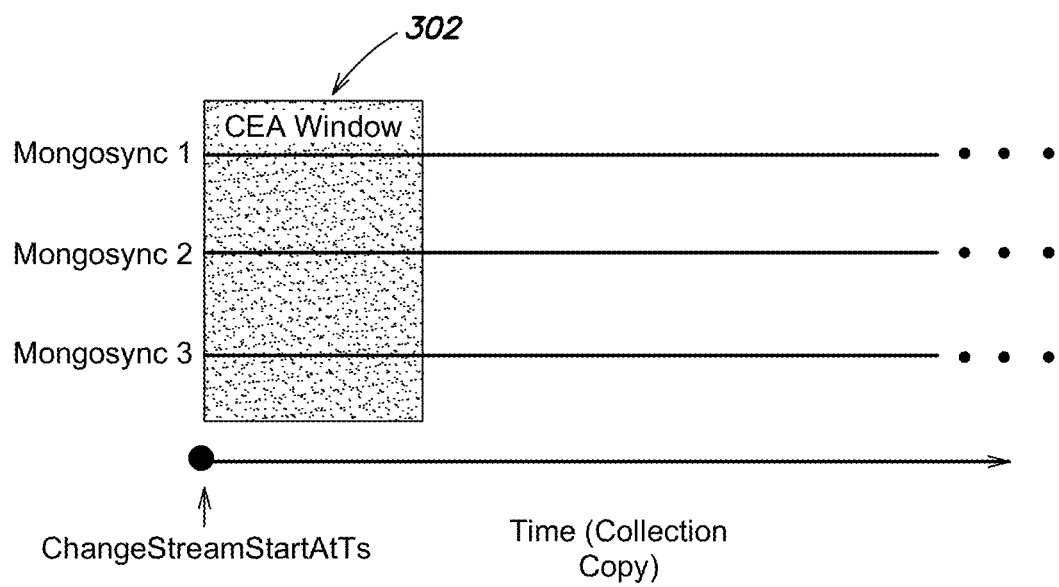
FIG. 4 illustrates an upper bound of a CEA window for an exemplary scenario of an exemplary embodiment.

In some embodiments, the lower bound of the CEA window 302 is initially the starting time value of ChangeStreamStartAtTs, as shown in FIG. 3. In some embodiments, the CEA window 302 may acquire an arbitrary upper bound when change events begin to be applied, as shown in FIG. 4. In some embodiments, the upper bound is obtained from an operation time from the source cluster. In some embodiments, the CEA window's area represents the number of change events that may be applied across the Mongosyncs' change streams.

Figure 5:
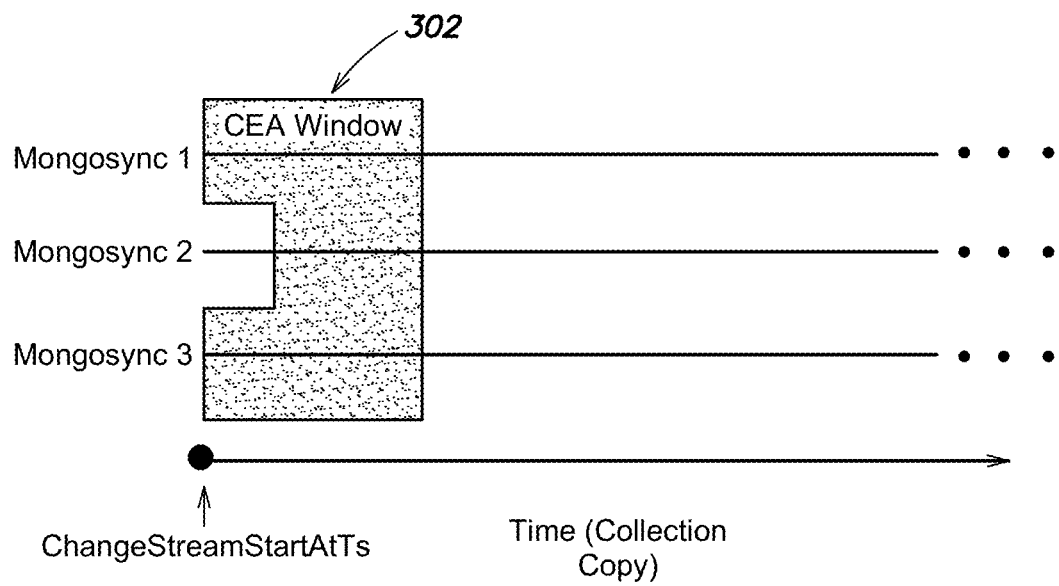
FIG. 5 illustrates a modification of a lower bound and an upper bound of a CEA window for an exemplary scenario of an exemplary embodiment.
Figure 6:
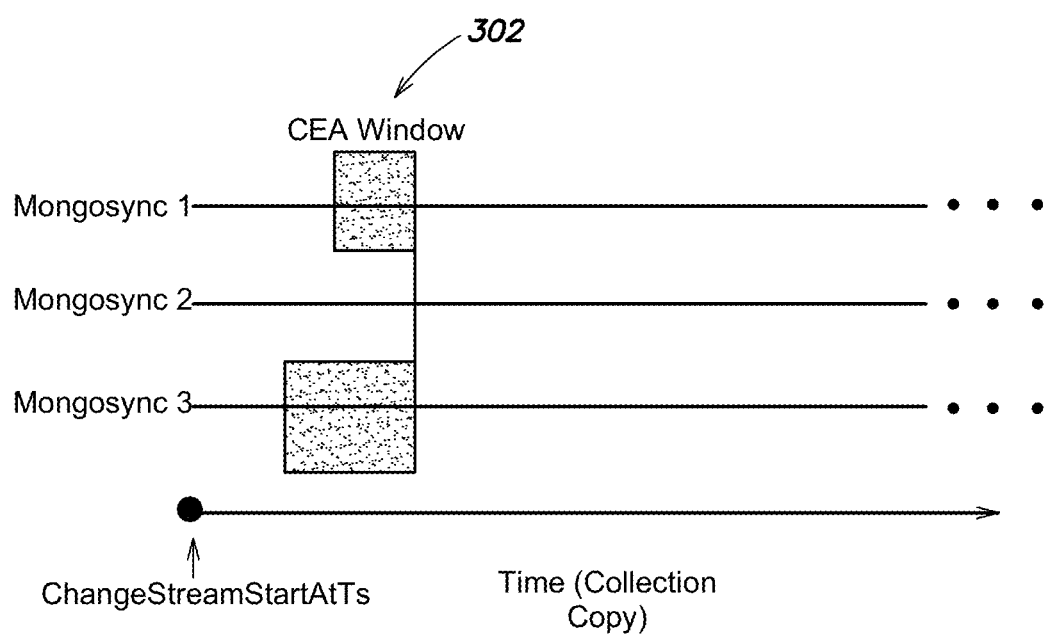
FIG. 6 illustrates an exemplary scenario in which one Mongosync finishes its CEA cycle before other Mongosyncs in an exemplary embodiment.
Figure 7:
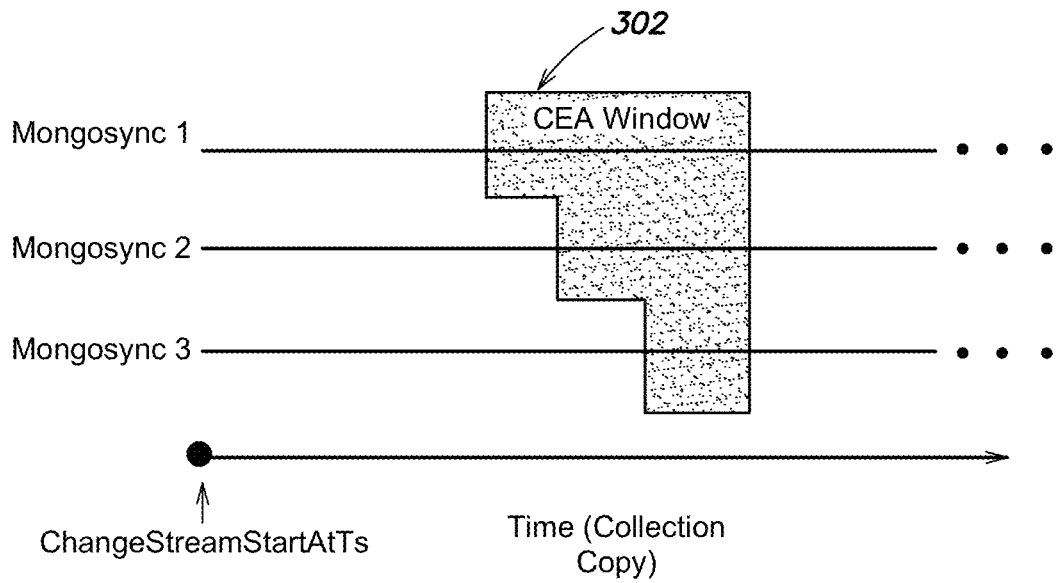
FIG. 7 illustrates an exemplary scenario in which one Mongosync starts a cycle after other Mongosyncs in an exemplary embodiment.

In some embodiments, when a Mongosync detects a new upper bound for a CEA window, its goroutine will run a CEA cycle to increase the lower bound for the CEA window 302, as shown in FIG. 5. In the exemplary scenario of FIG. 5, Mongosync 2 executes its CEA cycle first. In the exemplary scenario of FIG. 6, Mongosync 2 finishes its CEA cycle while Mongosync 1 and Mongosync 2 continue to execute their CEA cycles. In some embodiments, a CEA window's upper bound may increase if more partitions are copied. In some embodiments, a CEA cycle goroutine will check a CEA window's upper bound periodically and apply events. In the scenario shown in FIG. 7, Mongosync 2 takes a bit longer to start its next cycle, Mongosync 3 is ahead, and Mongosync 1 takes longer, perhaps because it may have a higher density of events for the current CEA window.

Figure 8:
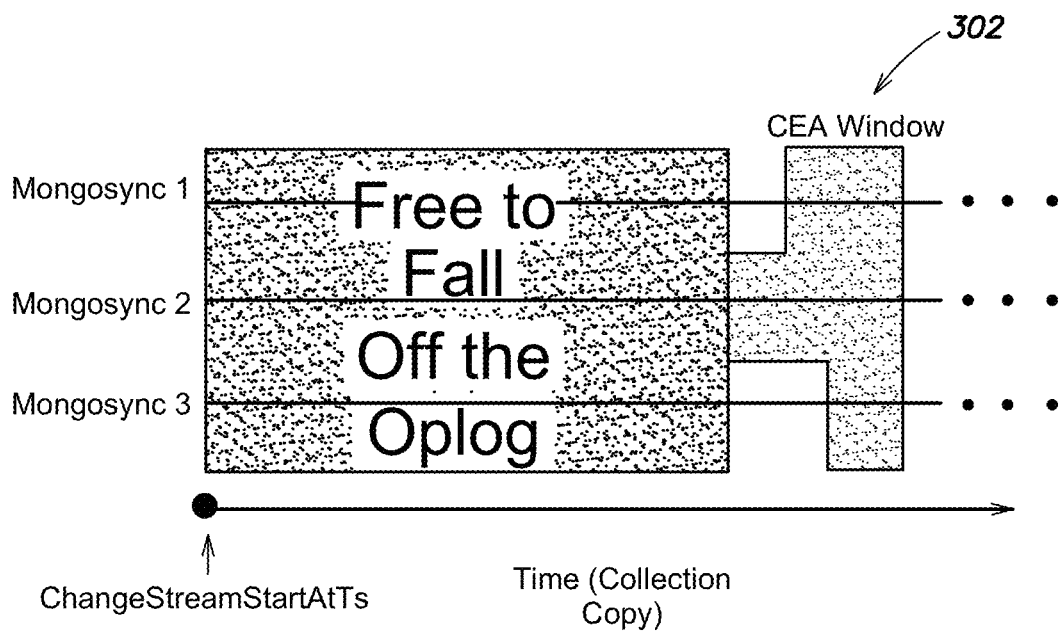
FIG. 8 illustrates an exemplary scenario for the copying of partitions in a collection copy phase of an exemplary embodiment.

In some embodiments, the relative rates at which the Mongosyncs apply their change events are not important. In some embodiments, the copying of partitions in the collection copy phase may continue and anything below the "global" lower bound of the CEA window 302 is free to fall off the operation log, as illustrated in the exemplary scenario of FIG. 8.

In some embodiments, a CEA window's lower bound may advance whenever a Mongosync makes progress with its own change stream during a CEA cycle. In some embodiments, each Mongosync may update various fields (e.g., CRUDResumeInfo, DDLResumeInfo). In some embodiments, each CEA cycle may be finite (e.g., have a defined endpoint). In some embodiments, when a CEA cycle's resume token is greater than or equal to the endpoint, the CEA cycle may stop iterating the change stream and may update the CRUDResumeInfo/DDLResumeInfo resume data fields to the resume token of the previous event. In some embodiments, a resume token is provided as a StartAfter value when opening the change stream, which excludes the change event corresponding to the resume token. In some embodiments, the next CEA cycle may use this new token as its starting point.

In some embodiments, in a situation where there are no change events occurring on the source cluster, a CEA cycle may be terminated when a Mongosync writes a no-op upon finishing a partition so that a Mongosync may not block on a change event indefinitely. In some embodiments, Mongosync may include a LastOpFetchingService, which writes a no-op every second. FIG. 9 illustrates the timestamps of resume tokens 950 for a Mongosync in an exemplary scenario. In some embodiments, a current CEA window's upper bound may be known ahead of time when a CEA cycle starts. In some embodiments, a cycle will apply all change events following resume token $T_0$ until it sees a resume token $T_N$ that is greater than the CEA window's upper bound. In some embodiment, the Resume Token for the last event applicated will be set to $T_{N-1}$ from which the next cycle will continue. In this manner, a CEA window's lower bound may be advanced. In some embodiments, change events up to a point are applied and that point is saved using a resume token.

Figure 11:
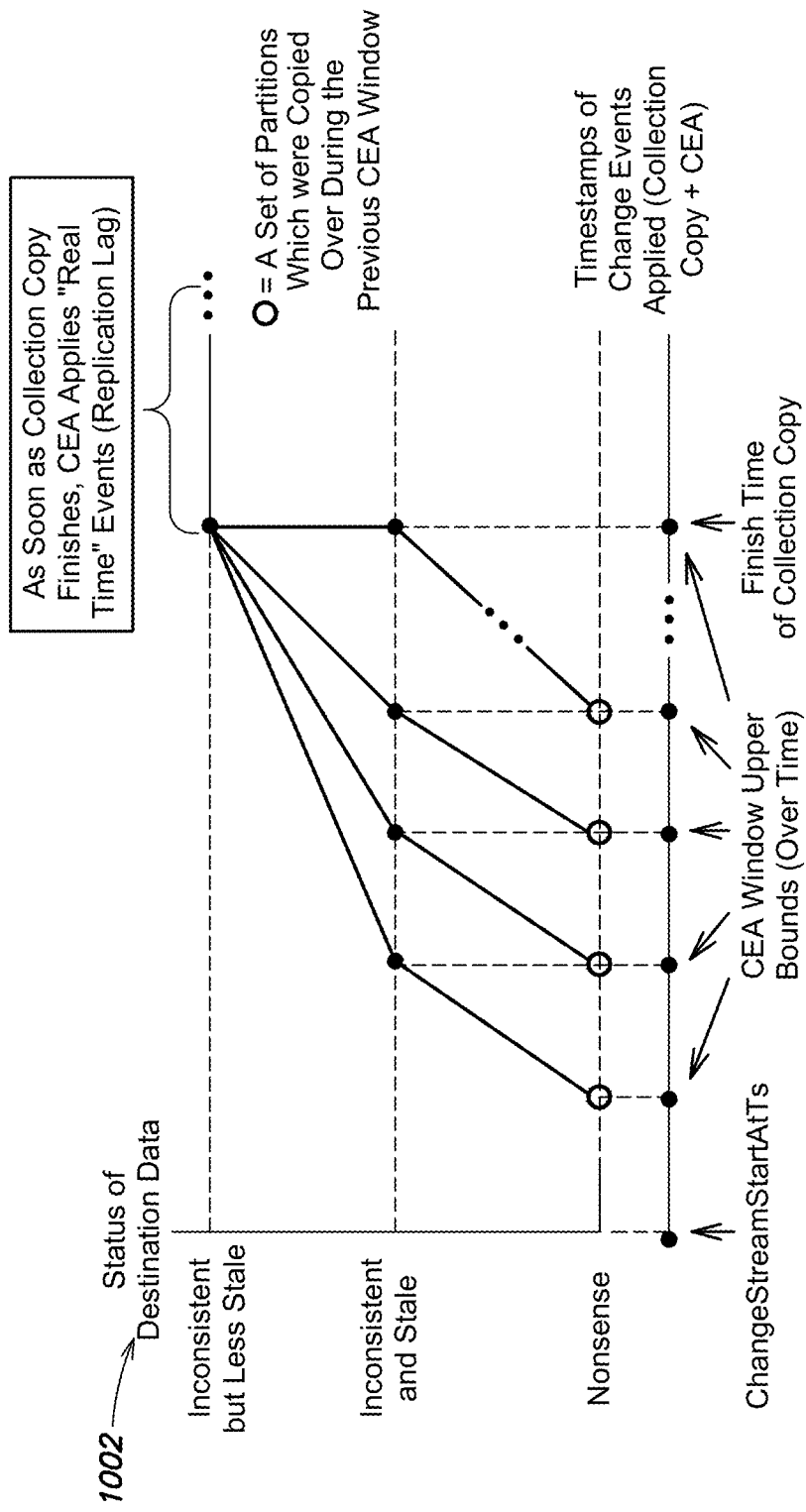
FIG. 11 is a graph of the status of the destination data as a function of the times stamps of the CEAs for another exemplary scenario of another exemplary embodiment.

In some embodiments, an upper bound of a CEA window is calculated by the Mongosyncs. In some embodiments, a change event includes a DDL event, an insert event, an event to update, replace or delete a document which known to be on the destination, etc. In some embodiments, a state of a destination cluster relative to a source cluster will transition from a "nonsense" state to an "inconsistent and stale" state after all events before a point in time are applied. In some embodiment, a state of a destination cluster relative to a source cluster will transition to an "inconsistent but less stale" state after events subsequent to the point in time are applied. FIG. 10 is a graph of the status or states 1002 of the destination data as a function of the times stamps of the CEAs for an exemplary embodiment. FIG. 11 is a graph of the status or states 1002 of the destination data as a function of the times stamps of the CEAs for another exemplary embodiment.

In some embodiments, a first set of partitions is copied; change events are applied to the first set of copied partitions; as second set of partitions is copied; additional change events are applied to the second set of partitions, etc. In some embodiments, additional change events are applied not only to the most recent set of partitions that have been copied but to all preceding partitions that have been copied. In some embodiments, an up-to-date measure is maintained for all sets of partitions that have been copied curing the course of the collection copy phase.

In some embodiments, the number of changes events that may be applied by a Mongosync are limited while other Mongosyncs are permitted to proceed with copying partitions. In some embodiments, partitions are periodically checked to determine if change events may be applied for them. In some embodiments, the extent to which change events may be applied is limited by the earliest partition finish time across all Mongosyncs.

Figure 12:
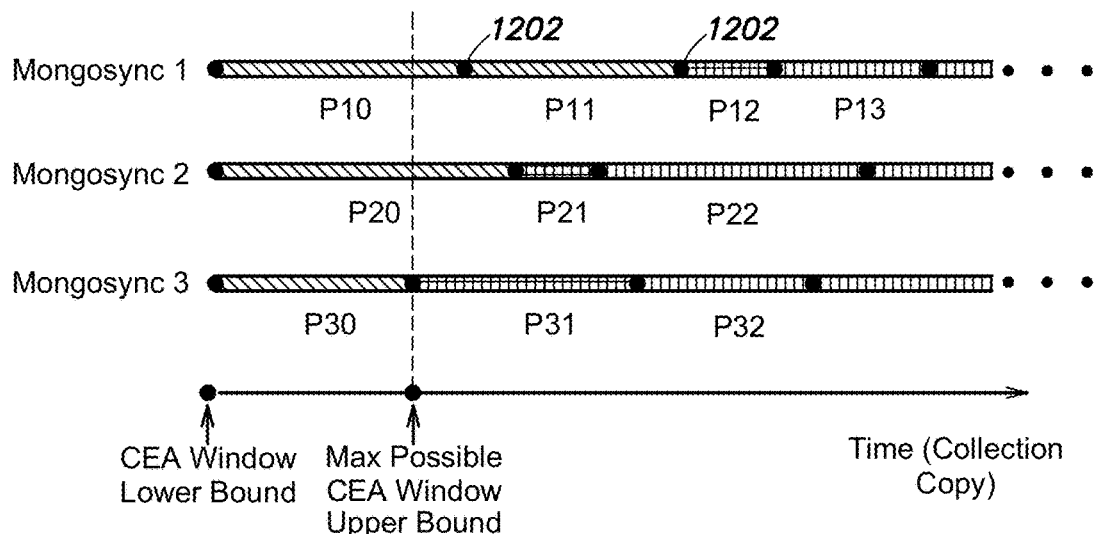
FIG. 12 shows an exemplary scenario of Mongosyncs copying partitions during a collection copy phase for an exemplary embodiment.

FIG. 12 shows an exemplary scenario of Mongosyncs copying partitions during a collection copy phase. Each black dot 1202 represents the completion of a copying of a partition; a vertical magenta line represents an upper bound of the CEA window; a green segment represents the completion of a copying of a partition; a yellow segment represents an in progress copying of a partition, and a red segment represents a partition which resides in a queue waiting to be copied.

In some embodiments, change events are applied until the leftmost green-yellow transition. In some embodiments, a CEA cycle is executed from the current CEA window's lower bound to the earliest partition completion time across all Mongosyncs (e.g., P30's completion time in FIG. 12). In some embodiments, each Mongosync will periodically update its latest partition finish times, thereby enabling a cycle to implicitly include more than one partition's finish times.

Figure 13:
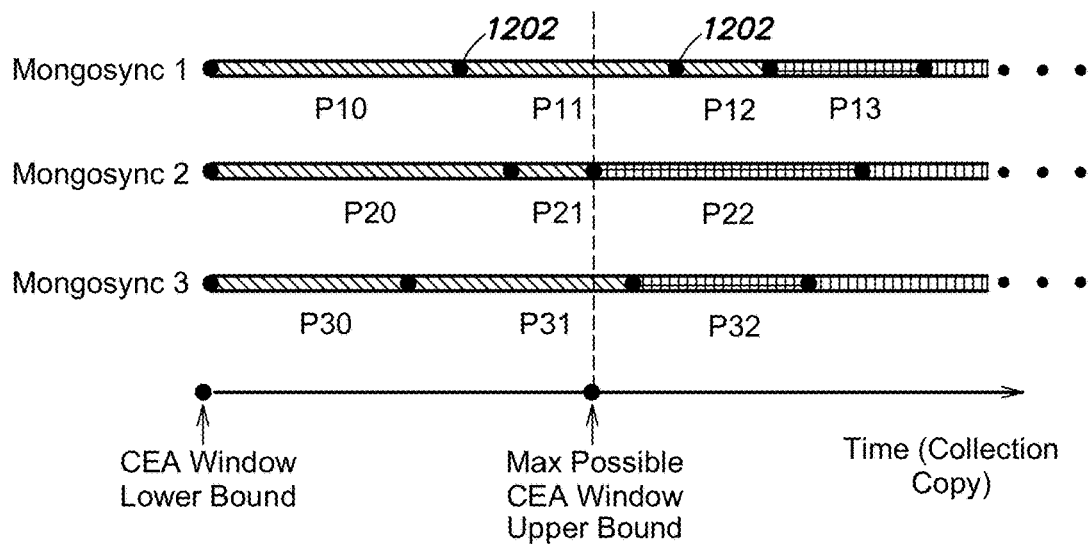
FIG. 13 illustrates an exemplary scenario showing the finish times for a set of partitions for an exemplary embodiment.

FIG. 13 illustrates an exemplary scenario in which the finish times for partitions P10, P20, P21 and P30 are all implicitly included. In some embodiments, change events are effectively batched CEA cycles, thereby reducing overhead in opening change streams.

In some embodiments, a CEA window upper bound is the minimum of the latest partition finish times across all Mongosyncs. In some embodiments, the latest partition finish times may be stored within the partition documents in a field (e.g., the FinishedAtTs field). In some embodiments, the FinishedAtTs field may represent the source cluster operation time immediately following the copying of the last document of a partition and may be set to the timestamp resulting from executed an appendOplogNote command (e.g., a no-op write) on the source cluster.

In some embodiments, a Mongosync may always copy multiple partitions in parallel and may set the FinishedAtTs field for each one upon completion of a partition. In some embodiments, the latest (i.e., the maximum) of the FinishedAtTs values within a Mongosync, and the earliest (i.e., the minimum) of these timestamps across all Mongosyncs are retrieved and stored. Taking the maximum first ensures that the CEA window's upper bound can actually advance, while taking the minimum ensures that change events are only applied up to the correct point in time.

Figure 14:
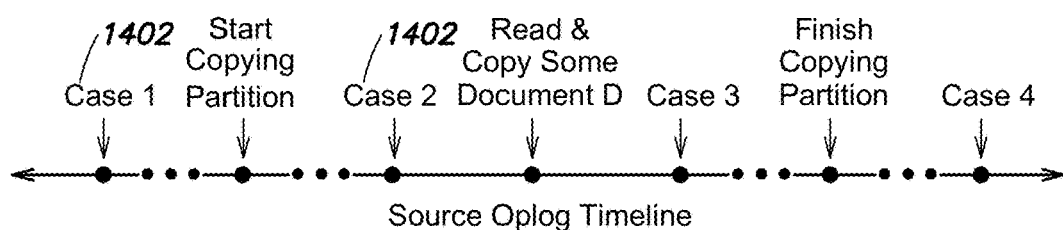
FIG. 14 illustrates a set of possible cases for when a change event may occur in an exemplary scenario of an exemplary embodiment.

In some embodiments, there are four possible cases 1402 for when a change event occurs relative to reading and copying a document, as shown in FIG. 14:

Case 1—The change event is already reflected in document D by the time D is copied. In this case, the event will not be applied because it occurred before the partition was started;

Case 2—The change event is already reflected in document D by the time D is copied. In this case, although the event may be ignored, it may nonetheless be redundantly applied because it is an idempotent operation;

Case 3—The change event is not yet reflected in document D by the time D is copied. In this case, the event must be applied, preferably as soon as the CEA window's upper bound is advanced to include this partition's finish time; and Case 4—The change event is similar to case 3 but for the finish time of some upcoming partition. In this case, it will take longer to apply the event.

In some embodiments, a Mongosync may set various fields (e.g., T and I fields) within the FinishedAtTs fields to a maximum value when the Mongosync finishes its partitions so that it cannot be selected as the minimum. In some embodiments, a CEA cycle goroutine may continue executing for a Mongosync that has finished all of its partitions. In some embodiments, when the CEA upper window eventually returns a timestamp with a maximum value for both the T and I fields, this will be interpreted as an exit condition indicating that all Mongosyncs have finished, and that each Mongosync may exit the collection copy phase and continue to the regular CEA phase. In some embodiments, a Mongosync may update its phase and persist it. In some embodiments, the regular CEA phase may then continue from the CRUDResumeInfo/DDLResumeInfo stored in each Mongosync's resume data. In some embodiments, the transition from the collection copy phase to the regular CEA phase may remain synchronous, meaning that all Mongosyncs must finish the collection copy phase before moving to the regular CEA phase. Because each Mongosync's CEA cycle goroutine may continue to execute after its partitions are finished in some embodiments, the actual transition to the CEA phase may never need to be known because the CEA phase is built into the collection copy phase.

Assuming fairly randomized writes on the source cluster during the collection copy phase, most CRUD events applied early in the collection copy phase may fail because few documents may exist on the destination at this point in time. As the collection copy continues, the success rate for applying CRUD events will get progressively better with each CEA cycle. In some embodiments, these failures may be ignored if the document does not yet exist on the destination. In some embodiments, a change stream may be filtered for CRUD events pertaining to documents that are known to have been copied so as to reduce the number of events that are needlessly applied. In some embodiments, filtering may effectively double the average success rate.

For CRUD events in some embodiments, each change stream's filter may include the union of the identifier ranges of all partitions that have finished across all Mongosyncs. In some embodiments, the filter may include an accumulating set of identifier ranges derived from finished partitions. In some embodiments, change events are applied for a document indefinitely after it has been copied. In some embodiments, ranges of adjacent partitions that have finished may be combined before the ranges for the change stream filter are used, to delay reaching any BSON limit. For example, if the following partition progress has been made for a given collection:

{uuid: 42, partitionPhase: "done", lowerBound: 0, upperBound: 100}
{uuid: 42, partitionPhase: "done", lowerBound: 100, upperBound: 200}
{uuid: 42, partitionPhase: "done", lowerBound: 200, upperBound: 300}
{uuid: 42, partitionPhase: "not started", lowerBound: 300, upperBound: 400}
{uuid: 42, partitionPhase: "done", lowerBound: 400, upperBound: 500}
{uuid: 42, partitionPhase: "done", lowerBound: 500, upperBound: 600} the ranges for all partitions may be combined where possible, thereby resulting in two combined partition ranges [0, 300] and [400, 600].

Figure 15:
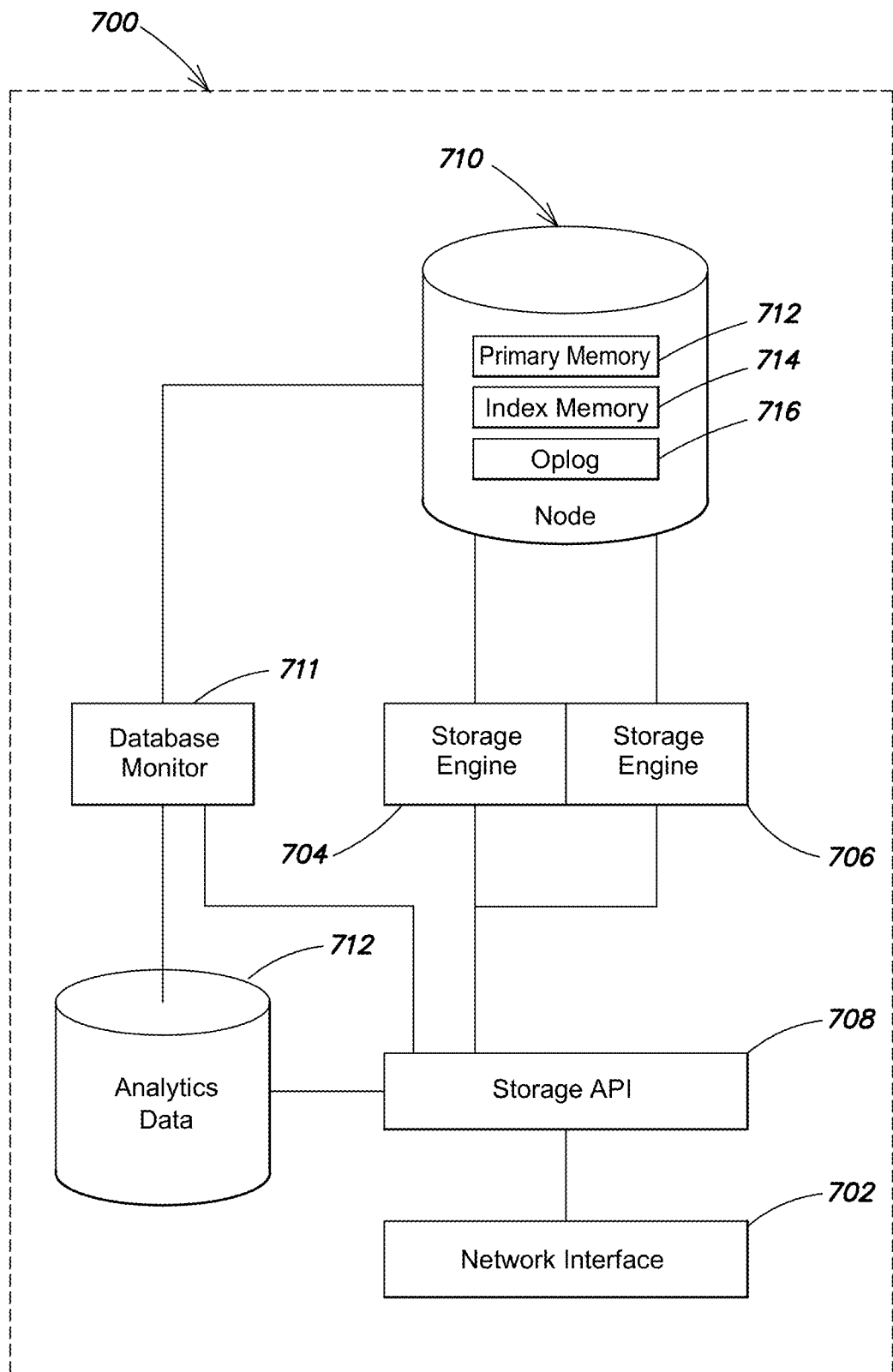
FIG. 15 shows a block diagram of a distributed database system in which various embodiments may be implemented.

Various embodiments as discussed herein may be implemented on various database and storage systems. FIG. 15 shows a block diagram of a distributed database system in which various embodiments may be implemented. In particular, FIG. 15 shows an example of a database subsystem 700 that may be implemented in cloud storage system (and/or a local storage system). The database subsystem 700 is one example implementation of all or any portion of the database management system shown by way of example in FIG. 1. The database subsystem 200 includes an interface 702 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, which is hereby incorporated by reference in its entirety. The database subsystem 700 includes a storage application. In one implementation described in greater detail below, a base unit of data is a document.

In some embodiments, a storage application programming interface (API) 708 receives database requests, including requests to perform read and write operations. When a write operation is requested, the storage API 708 in response selectively triggers a first storage engine 704 or a second storage engine 706 configured to store data in a first data format or second data format, respectively, in node 710. As discussed in more detail below, a database monitor 711 may track a number of analytics about the database. In some embodiments, the database monitor 711 is configured to track the operations performed on the data over time, and stores that information as analytics data 713. In some examples, analytic data may be stored in a separate database. In other examples, the analytics data is stored as a name collection (i.e., a logical grouping of data). These analytics may be provided to the storage API 708, which relies on the analytics to selectively actuate an appropriate storage engine. In further embodiments, although multiple storage engines are provided, not all storage engines may operate with snapshots. Responsive to a command execution that includes operations involving snapshots, the system may force use of a particular storage engine or alternatively provide error information that the current storage engine does not support the functionality. Thus, the system can be configured to check capability of storage engines to support certain functions (e.g., snapshot read functions) and report on the same to end users.

In one example, the database monitor 711 tracks the relative number of read and write operations performed on a collection within the database. In another example, the database monitor 711 is configured to track any operations (e.g., reads, writes, etc.) performed on any base unit of data (e.g., documents) in the database.

In some embodiments, the storage API 708 uses the tracked data (e.g., analytics data) collected by the database monitor 711 and/or the analytics data 713 to select an optimal storage engine for a database, a collection, or a document having the observed read/write ratio. In one example, the storage API 708 is mapped to the selected storage engine. For example, an identifier of the selected storage engine may be stored in a location in memory or on disk; when a write operation request is received by the storage API 708, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 711 itself is configured to determine an optimal storage engine based on the analytics data 713 and other aspects of the data, for example, stored in the database, database collection, or in a document. This determination may be passed to the storage API 708, or otherwise used to map the storage API 708 to a determined storage engine.

The storage API 708 receives database write requests (e.g., from a database API (not shown)) via a network interface 707, and carries out the requested operations by selectively triggering one of the first storage engine 704 and the second storage engine 706. The first storage engine 704 and the second storage engine 706 are executable software modules configured to store database data in the data node 710 in a particular data format. For example, the first storage engine 704 may be configured to store data in a row-store format, and the second storage engine 706 may be configured to store data in a LSM-tree format. In one example, the first storage engine 704 and/or the second storage engine 706 are configured store primary database data (i.e., the data being stored and queried) in a particular data format in the primary data memory 712 and may store database index data in a particular data format in index data memory 714. In one embodiment, the first storage engine 704 and/or the second storage engine 706 are configured store an operation log (referred to as an "oplog") 716 in a particular data format. As discussed in more detail below, a database monitor 711 may track a number of analytics about the database, and the operations performed on it over time, and stores that information as analytics data 713.

One advantage of using the storage API 708 as an abstraction layer between the database API and the storage engines is that the identity and selection of a particular storage engine can be transparent to the database API and/or a user interacting with the database API. For example, the database API may pass a "write" function call to the storage API 708 instructing the storage API to write a particular set of data to the database. The storage API 108 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 708, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 708 is the ability to add, remove, or modify storage engines without modifying the requests being passed to the API 708. The storage API 708 is configured to identify the available storage engines and select the appropriate one based on one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

Figure 16:
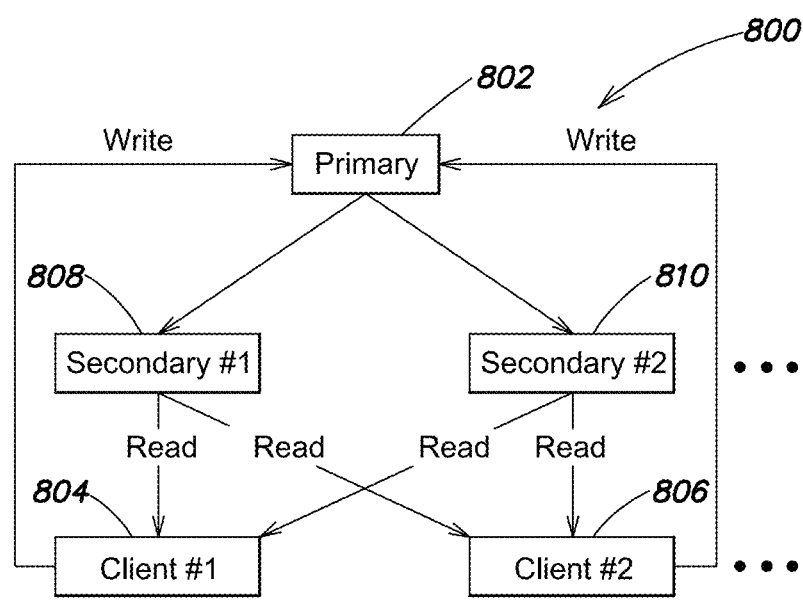
FIG. 16 illustrates a block diagram of an example replica set hosting a distributed database, according to some embodiments.

The embodiment shown and discussed with respect to FIG. 15 depicts a single database node 710. Yet in some embodiments, multiple database nodes may be provided and arranged in a replica set. FIG. 16 shows a block diagram of an exemplary replica set 800. Replica set 800 includes a primary node 802 and one or more secondary nodes 808 and 810, each of which is configured to store a dataset that has been inserted into the database. The primary node 802 may be configured to store all of the documents currently in the database and may be considered and treated as the authoritative version of the database in the event that any conflicts or discrepancies arise, as will be discussed in more detail below. While two secondary nodes 808, 810 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 802 and secondary nodes 808, 810 may be configured to store data in any number of database formats or data structures as are known in the art. In a preferred embodiment, the primary node 802 is configured to store documents or other structures associated with non-relational databases. The embodiments discussed herein relate to documents of a document-based database, such as those offered by MongoDB, Inc. (of New York, New York and Palo Alto, California), but other data structures and arrangements are within the scope of the disclosure as well.

In some embodiments, the replica set primary node 802 only accepts write requests (disallowing read requests) from client systems 804, 806 and the secondary nodes 808, 810 only accept reads requests (disallowing write requests) from client systems 804, 806. In such embodiments, the primary node 802 receives and processes write requests against the database, and replicates the operation/transaction asynchronously throughout the system to the secondary nodes 808, 810. In one example, the primary node 802 receives and performs client write operations and generates an oplog. Each logged operation is replicated to, and carried out by, each of the secondary nodes 808, 810, thereby bringing those secondary nodes into synchronization with the primary node 802. In some embodiments, the secondary nodes 808, 810 may query the primary node 802 to receive the operation log and identify operations that need to be replicated. In other embodiments, the operation log may be transmitted from the primary node 802 to the secondary nodes 808, 810 periodically or in response to the occurrence of a predefined condition, such as accruing a threshold number of operations in the operation log that have not yet been sent to the secondary nodes 808, 810. Other implementations can be configured to provide different levels of consistency, and, for example, by restricting read requests. According to one embodiment, read requests can be restricted to systems having up to date data, read requests can also in some settings be restricted to primary systems, among other options.

In some embodiments, both read operations may be permitted at any node (including primary node 802 or secondary nodes 808, 810) and write operations limited to primary nodes in response to requests from clients. The scalability of read operations can be achieved by adding nodes and database instances. In some embodiments, the primary node 802 and/or the secondary nodes 808, 810 are configured to respond to read operation requests by either performing the read operation at that node or by delegating the read request operation to another node (e.g., a particular secondary node 808). Such delegation may be performed based on load-balancing and traffic direction techniques. In other embodiments, read distribution can be managed based on a respective snapshot available at various nodes within a distributed database. For example, the system can determine based on analyzing client requested data what snapshot is associated with the requested data and what node hosts the respective data or snapshot that can be used to provide the requested data. In one example, a data routing processor accesses configuration files for respective replica sets to determine what node can respond to a data request, and further analysis of respective snapshots can determine, for example, what node within a replica set needs to be accessed.

In some embodiments, the primary node 802 and the secondary nodes 808, 810 may operate together to form a replica set 800 that achieves eventual consistency, meaning that replication of database changes to the secondary nodes 808, 810 may occur asynchronously. When write operations cease, all replica nodes of a database will eventually "converge," or become consistent. The eventually consistent model provides for a loose form of consistency.

Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 808, 810 may handle the bulk of the read operations made on the replica set 800, whereas the primary node 808, 810 handles the write operations. For read operations where a high level of accuracy is important (such as the operations involved in creating a secondary node), read operations may be performed against the primary node 802. In some embodiments, replica set 800 can be configured to perform according to a single writer eventually consistent model.

It will be appreciated that the difference between the primary node 802 and the one or more secondary nodes 808, 810 in a given replica set may be largely the designation itself and the resulting behavior of the node; the data, functionality, and configuration associated with the nodes may be largely identical, or capable of being identical (e.g., secondary nodes can be elevated to primary nodes in the event of failure). Thus, when one or more nodes within a replica set 800 fail or otherwise become available for read and/or write operations, other nodes may change roles to address the failure. For example, if the primary node 802 were to fail, a secondary node 808 may assume the responsibilities of the primary node, allowing operation of the replica set to continue through the outage. This failover functionality is described in U.S. application Ser. No. 12/977,563, the disclosure of which is hereby incorporated by reference in its entirety.

Each node in the replica set 800 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 802 may be connected by a LAN, a WAN, or other connection to one or more of the secondary nodes 808, 810, which in turn may be connected to one or more other secondary nodes in the replica set 800. Connections between secondary nodes 808, 810 may allow the different secondary nodes to communicate with each other, for example, in the event that the primary node 802 fails or becomes unavailable and a secondary node must assume the role of the primary node.

According to one embodiment, a plurality of nodes (e.g., primary nodes and/or secondary nodes) can be organized in groups of nodes in which data is stored and replicated across the nodes of the set. Each group can be configured as a replica set. In another embodiment, one or more nodes are established as primary nodes that host a writable copy of the database. Each primary node can be responsible for a portion of the database, e.g. a database shard. Database sharding breaks up sections of the database into smaller portions based on, for example, ranges of the data. In some implementations, database sharding facilitates scaling a primary-secondary architecture over a large number of nodes and/or large database implementations. In one embodiment, each database shard has one primary node which replicates its data to its secondary nodes. Database shards can employ location preferences. For example, in a database that includes user records, the majority of accesses can come from specific locations. Migrating a shard primary node to be proximate to those requests can improve efficiency and response time. For example, if a shard for user profile includes address information, shards can be based on ranges within the user profiles, including address information. If the nodes hosting the shard and/or the shard primary node are located proximate to those addresses, improved efficiency can result, as one may observe the majority of requests for that information to come from locations proximate to the addresses within the shard.

Figure 17:
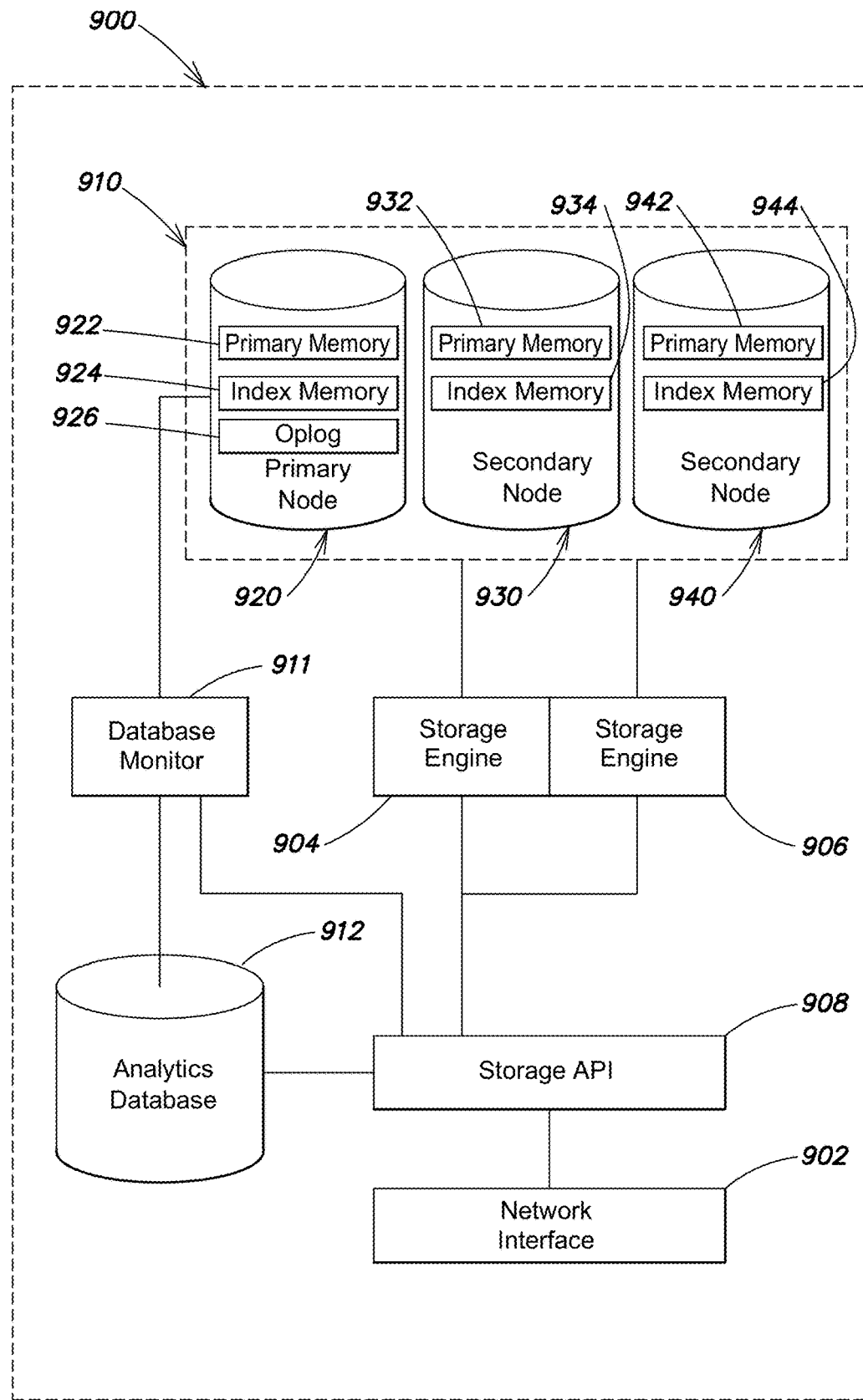
FIG. 17 illustrates a block diagram of another example distributed database system, according to some embodiments.

An example of a database subsystem 900 incorporating a replica set 410 is shown in FIG. 17. As can be seen, database subsystem 900 incorporates many of the elements of database subsystem 700 of FIG. 15 including the network interface 702, the storage engines 704, 706, the storage API 708, the database monitor 711, and the analytics database 712. Relative to the database subsystem 700 shown in FIG. 15, the database subsystem 900 replaces the single node 710 with a replica set 910 comprising primary node 920 and secondary nodes 930 and 940. In one example, the replica set 910 functions in much the same manner as the replica set 800 discussed with respect to FIG. 16. While only two secondary nodes 930 and 940 are shown for illustrative purposes, it will be appreciated that the number of secondary nodes may be scaled up or down as desired or necessary.

In one example, database operation requests directed to the replica set 910 may be processed by the primary node 920 and either performed by the primary node 920 or directed to a secondary node 930, 940 as appropriate. In one embodiment, both read and write operations are permitted at any node (including primary node 920 or secondary nodes 930, 940) in response to requests from clients. The scalability of read operations can be achieved by adding nodes and database instances. In some embodiments, the primary node 920 and/or the secondary nodes 930, 940 are configured to respond to read operation requests by either performing the read operation at that node or by delegating the read request operation to another node (e.g., a particular secondary node 930). Such delegation may be performed based on various load-balancing and traffic direction techniques.

In some embodiments, the database only allows write operations to be performed at the primary node 920, with the secondary nodes 930, 940 disallowing write operations. In such embodiments, the primary node 920 receives and processes write requests against the database, and replicates the operation/transaction asynchronously throughout the system to the secondary nodes 930, 940. In one example, the primary node 920 receives and performs client write operations and generates an oplog. Each logged operation is replicated to, and carried out by, each of the secondary nodes 930, 940, thereby bringing those secondary nodes into synchronization with the primary node 920 under an eventual-consistency model.

In one example, primary database data (i.e., the data being stored and queried) may be stored by one or more data storage engines in one or more data formats in the primary data memory 922, 932, 942 of nodes 920, 930, 940, respectively. Database index data may be stored by one or more data storage engines in one or more data formats in the index data memory 924, 934, 944 of nodes 920, 930, 940, respectively. Oplog data may be stored by a data storage engine in a data format in oplog data memory 926 of node 920.

In some embodiments, logging for interaction with source and destination clusters as well as the internal status change may be used inside a replicator. In some embodiments, a fatal level logs all the scenarios that cause the termination of the process. In some embodiments, error level logs unexpected responses or status change regardless if it's fatal or recoverable. In some embodiments, internal status change and migration progress are tracked on an information level. When there is a DDL operation, some embodiments record the event itself as well as the operation sent to the destination. On the debug level, some embodiments log information that may be helpful to the debugging such as queue size, batch size, each writer's status, connection status, etc. On a trace log level, some embodiments log any request/response body with a driver except content of the migration data.

In some embodiments, a globalStateDoc will be inserted by one of the mongosyncs to the destination cluster. In some embodiments, the mongosync that successfully performs the insert is recognized as the coordinator. In some embodiments, the GlobalStateDoc will exist even in the single replica set configuration. In some embodiments, the single replicator will always become the coordinator to avoid having branching behavior between the single and multiple replicator configuration cases. In some embodiments, the globalStateDoc will include the following fields:

_id: <string>: "globalStateDoc"

ChangeStreamTS: <Timestamp> The timestamp to start ChangeEventApplication

Coordinator: <string> The id of the coordinator mongosync

Replicator: <Subdocument representing list of mongosync ids> A list of ids of every mongosync in the current configuration (including the coordinator). In some embodiments, this field will have a single entry (just the coordinator) in the single replicator case and will have shardIds in the multiple replicator case.

reversible: <bool> An indicator of whether or not a particular C2C replication is reversible. In some embodiments, this field is set by passing in the value in the/start command, and may not be changed mid-replication.

In some embodiments, mongosyncs rely on the GlobalStateDoc to gather information about the global replicator configuration on failover recovery. In an exemplary configuration, only the coordinator is allowed to write to this document.

FIG. 18 is a flow diagram of an exemplary embodiment of a method 1800 to replicate data from a source database cluster to a destination database cluster with a plurality of replicators. In step 1802, data is replicated by a first replicator from a first subset of a source database cluster to a destination database cluster. In step 1804, data is replicated by a second replicator from a second subset of the source database cluster to the destination database cluster. In some embodiments, steps 1802 and 1804 are executed at least partially in parallel. In some embodiments, data is replicated by a finite number of replicators wherein each replicator replicates data from a corresponding subset of the source database cluster to the destination data base cluster. In some embodiments, the replicating of data by the replicators from respective subsets of the source database cluster to the destination databased cluster is done at least partially in parallel.

In some embodiments, each replicator monitors an associated change stream comprising data indicative of a change of data in an associated subset of the source database cluster and translate the change of data to database operations to be performed to the destination database cluster. In some embodiments, each replicator replicates an index of data as a non-unique index from the source database cluster while it replicates data from the source database cluster to the destination database cluster. In some embodiments, each replicator converts a non-unique index to a unique index after its own replication as well as the replications of one or more other replicators are committed.

FIG. 19 is a flow diagram of an exemplary embodiment of a method 1900 to replicate data from a source database cluster to a destination database cluster with a plurality of replicators. In step 1902, a first replicator executes one or more first operations to replicate one or more associated partitions of data from the source database cluster to the destination database cluster. In step 1904, the first replicator monitors a respective change stream comprising data indicative of a change of data in the one or more partitions associated with the first replicator. In step 1906, the first replicator executes one or more second operations to translate the change of data to one or more database operations to be performed to the destination database cluster. In some embodiments, the execution of the first operations to replicate associated one or more partitions of data is interleaved with the execution of the second operations to translate the change of data to one or more data base operations.

In step 1908, a second replicator executes one or more first operations to replicate one or more associated partitions of data from the source database cluster to the destination database cluster. In step 1910, the second replicator monitors a respective change stream comprising data indicative of a change of data in the one or more partitions associated with the second replicator. In step 1912, the second replicator executes one or more second operations to translate the change of data to one or more database operations to be performed to the destination database cluster.

In some embodiments, the first replicator copies data from a first subset of the source database cluster to the destination database cluster and a second replicator copies data from a second subset of the source database cluster to the destination database cluster. In some embodiments, the copying of data from a respective subset of the source database cluster to the destination database cluster by the first and second replicators is done at least partially in parallel. In some embodiments, each replicator is configured to provide a second replication pathway, independent of a first replication architecture operating on the source database cluster.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

Additionally, and/or alternatively, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. A system comprising:
at least one processor configured to execute one or more first operations to replicate one or more associated partitions of data from a source database cluster to a destination database cluster, to monitor a respective change stream comprising data indicative of a change of data in the one or more partitions associated with the replicator, and to execute one or more second operations to translate the change of data to one or more database operations to be performed to the destination database cluster;
wherein the execution of the one or more first operations to replicate associated one or more partitions of data is interleaved with the execution of one or more second operations to translate the change of data to one or more data base operations;
wherein each of the source database cluster and the destination database cluster is a shard cluster comprising multiple shard servers hosting multiple shards of data;
wherein the at least one processor is configured to:
replicate data on a respective subset of the source database cluster to the destination database cluster; and
replicate data from a first subset of the source database cluster to the destination database cluster at least partially in parallel with replicating data from a second subset of the source database cluster to the destination database cluster.

2. The system of claim 1, wherein the at least one processor is configured to provide a second replication pathway, independent of a first replication architecture operating on the source database cluster.

3. The system of claim 2, wherein the first replication architecture includes:
a primary node hosting data of the source cluster and secondary nodes hosting copies of the primary node data, wherein the primary node accepts and processes write operations against the hosted data of the source cluster, and maintains an operation log reflecting changes to the hosted data of the source cluster, and wherein the secondary nodes maintain consistency in the hosted copies of the primary node data base on executing operations from the operation log.

4. The system of claim 1, wherein:
a first change stream corresponds to a first subset of shards in the source database cluster; and
a second change stream corresponds to a second subset of shards in the source database cluster, the second subset of shards being different from the first subset of shards.

5. The system of claim 1, wherein:
the at least one processor is further configured to replicate indexes of data from the source database cluster while replicating the data from the source database cluster to the destination database cluster; and
the at least one processor is further configured to:
cause each of the first replicator and the second replicator to replicate the indexes as non-unique indexes; and
convert the non-unique index to unique indexes when replications of the plurality of replicators including the at least the first and second replicators are committed.

6. The system of claim 5, wherein the at least one processor is further configured to:
- determine whether a violation of indexes exists; and
- in response to determining that a violation of indexes exists, output or cause to output a report comprising the violation on a user device.

7. The system of claim 1, wherein the at least one processor is further configured to:
- suspend operation of replicating data from the source database cluster to the destination database cluster; and
- resume replicating data from the source database cluster to the destination database cluster at where the suspended operation of replicating left off.

8. The system of claim 1, wherein the at least one processor is further configured to:
- receive user command to reverse replication; and
- reverse replication by replicating data from the destination database cluster to the source database cluster.

9. The system of claim 8, wherein the at least one processor is further configured to:
- determine whether replication of data from the source database cluster to the destination database cluster is committed before reversing replication; and
- in response to determining that the replication of data from the source data cluster to the destination database cluster is committed, execute functions to reverse replication.

10. The system of claim 1, wherein the at least one processor is further configured to:
- perform initial replication of data from the source database cluster to the destination database cluster; and
- after the initial replication of data from the source database cluster to the destination database cluster is completed, continue replicating data from the source database cluster to the destination database cluster based on subsequent data change on the source database cluster.

11. The system of claim 2, wherein:
- the destination database cluster comprises a last state for each document in the destination database cluster, the last state storing data about a most recently change to the document; and
- the at least one processor is further configured to:
  - detect a change event to a document;
  - retrieve the last state associated with the document; and
  - determine whether to apply the change event to the document based on the last state and a time the change event occurred.

12. The system of claim 11, wherein:
- the at least one processor is further configured to, when applying a change to a document, update the last state for the document to which the change is applied.

13. A method for replicating data from a source database cluster to a destination database cluster with a plurality of replicators comprising:
- causing each of the plurality of replicators to execute one or more first operations to replicate one or more associated partitions of data from the source database cluster to the destination database cluster,
- to monitor a respective change stream comprising data indicative of a change of data in the one or more partitions associated with the replicator, and
- to execute one or more second operations to translate the change of data to one or more database operations to be performed to the destination database cluster;
- wherein the execution of the one or more first operations to replicate associated one or more partitions of data is interleaved with the execution of one or more second operations to translate the change of data to one or more data base operations; and
- replicating data from a first subset of the source database cluster to the destination database cluster with a first replicator of the plurality of replicators; and
- replicating data from a second subset of the source database cluster to the destination database cluster with a second replicator of the plurality of replicators at least partially in parallel with the replicating data from the first subset of the source database cluster to the destination database cluster with the first replicator of the plurality of replicators.

14. The method of claim 13, further comprising:
- providing a second replication pathway, independent of a first replication architecture operating on the source database cluster.

15. The method of claim 13, further comprising:
- replicating indexes of data from the source database cluster while replicating the data from the source database cluster to the destination database cluster; and
- causing each of the first replicator and the second replicator to replicate the indexes as non-unique indexes; and
- converting the non-unique index to unique indexes when replications of the plurality of replicators including the at least the first and second replicators are committed.

16. The method of claim 15, further comprising:
- determining whether a violation of indexes exists; and
- in response to determining that a violation of indexes exists, outputting or causing to output a report comprising the violation on a user device.

17. The method of claim 13, further comprising:
- suspending operation of replicating data from the source database cluster to the destination database cluster; and
- resuming replicating data from the source database cluster to the destination database cluster at where the suspended operation of replicating left off.

18. The method of claim 13, further comprising:
- receiving user command to reverse replication; and
- reversing replication by replicating data from the destination database cluster to the source database cluster.

* * * * *